(12) United States Patent
Yoneoka et al.

(10) Patent No.: US 7,983,544 B2
(45) Date of Patent: Jul. 19, 2011

(54) SHAKE CORRECTION UNIT AND IMAGING APPARATUS

(75) Inventors: Hideki Yoneoka, Kanagawa (JP); Atsuomi Ohno, Tokyo (JP)

(73) Assignee: Sony Corporation, Tokyo (JP)

( * ) Notice: Subject to any disclaimer, the term of this patent is extended or adjusted under 35 U.S.C. 154(b) by 100 days.

(21) Appl. No.: 12/453,714

(22) Filed: May 20, 2009

(65) Prior Publication Data

US 2009/0310953 A1     Dec. 17, 2009

(30) Foreign Application Priority Data

Jun. 13, 2008  (JP) ................................ 2008-154851

(51) Int. Cl.
*G03B 17/00*     (2006.01)
(52) U.S. Cl. ...................... 396/55; 348/208.11; 359/557
(58) Field of Classification Search .................... 396/55; 348/208.11; 359/557
See application file for complete search history.

(56) References Cited

U.S. PATENT DOCUMENTS

2003/0067544 A1* 4/2003 Wada ......................... 348/208.7
2006/0051081 A1* 3/2006 Ogino .......................... 396/55
2006/0056829 A1* 3/2006 Hirota et al. .................... 396/54
2007/0292119 A1* 12/2007 Lee ................................. 396/55
2009/0007479 A1* 1/2009 Jerome, Sr. ...................... 43/2

FOREIGN PATENT DOCUMENTS

JP          2006-081348          3/2006

\* cited by examiner

*Primary Examiner* — Rodney E Fuller
*Assistant Examiner* — Fang-Chi Chang
(74) *Attorney, Agent, or Firm* — Rader Fishman & Grauer PLLC

(57) ABSTRACT

A shake correction unit includes: a base member; a first movable member that moves relative to the base member in a first direction; a second movable member to which an imaging device is fixed, the second movable member moving relative to the first movable member in a second direction; a first drive unit provided between the base member and the first movable member, the first drive unit moving the base member and the first movable member relative to each other in the first direction; and a second drive unit provided between the first movable member and the second movable member, the second drive unit moving the first movable member and the second movable member relative to each other in the second direction.

13 Claims, 18 Drawing Sheets

< I - I CROSS SECTION >

< II - II CROSS SECTION >

<III-III CROSS SECTION>

<IV-IV CROSS SECTION>

FIG.14
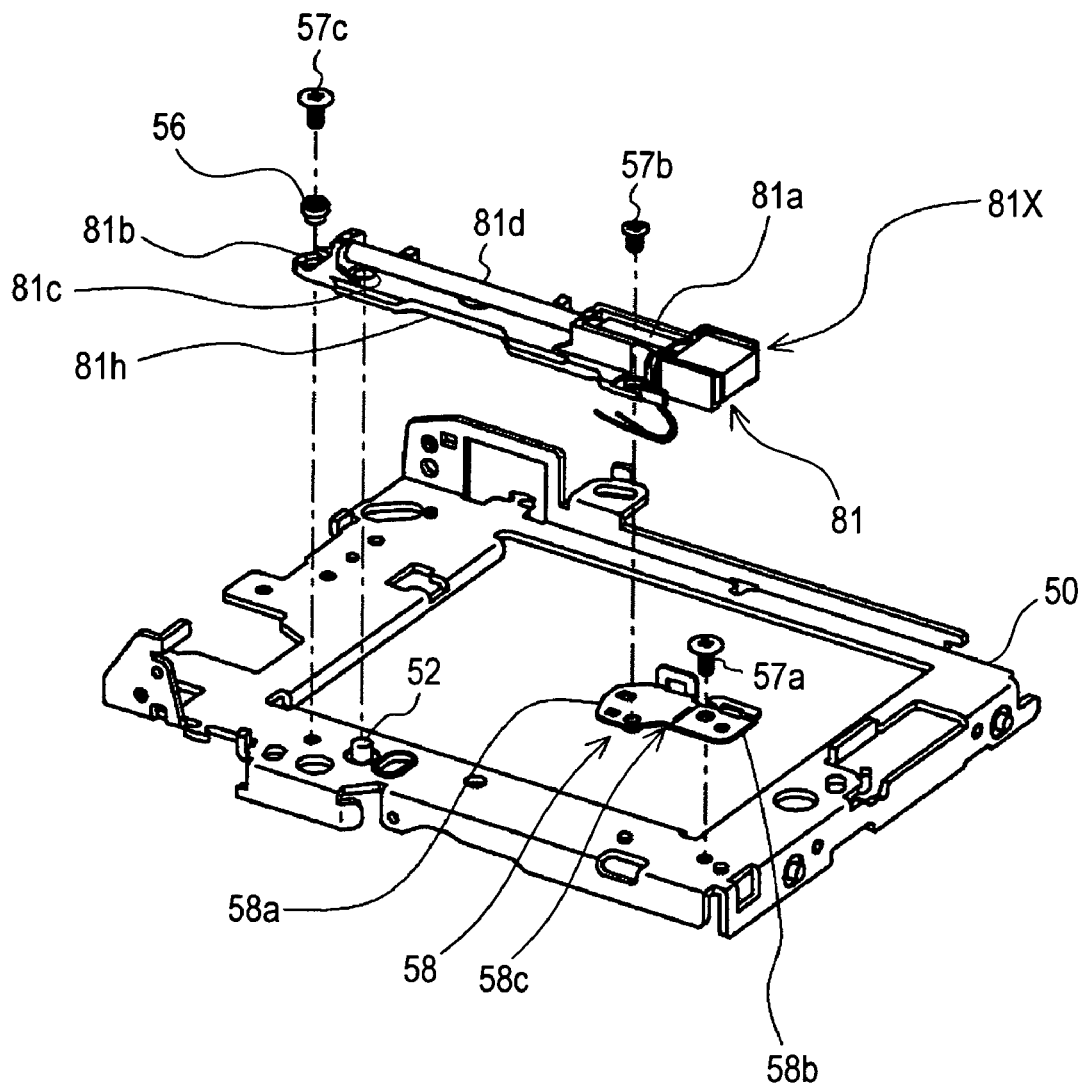
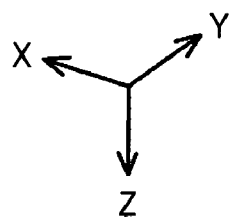

<V-V CROSS SECTION>

<V-V CROSS SECTION>

SHAKE CORRECTION UNIT AND IMAGING APPARATUS

BACKGROUND OF THE INVENTION

1. Field of the Invention

The present invention relates to a shake correction unit that corrects a shake caused by hands or any other similar shake, and an imaging apparatus including the shake correction unit.

2. Description of the Related Art

There is a technology for correcting a shake caused by hands or any other similar shake. For example, there is a shake correction unit that slightly swings an imaging device in a plane perpendicular to the optical axis of an imaging lens to cancel a shake (see JP-A-2006-81348).

Specifically, the shake correction unit described above includes a base member, a first movable member that moves relative to the base member in a first direction (X direction, for example), and a second movable member that moves relative to the first movable member in a second direction (Y direction, for example). A relative movement between the base member and the first movable member is achieved by a first drive unit, and a relative movement between the first movable member and the second movable member is achieved by a second drive unit. The second movable member, to which an imaging device is fixed, moves relative to the base member in the first and second directions for shake correction.

SUMMARY OF THE INVENTION

In an imaging apparatus, it is necessary to accurately position the imaging device in the optical axis direction to maintain high focusing precision.

In the shake correction unit described above, the second movable member, to which the imaging device is fixed, is pressed by a spring or any other suitable component and in contact with the base member, which is fixed in a predetermined position in the optical axis direction, via a steel ball or any other suitable component. The configuration described above allows the imaging device to be stably positioned in the optical axis direction.

More specifically, the second movable member (to which the imaging device is fixed) is preferably in contact with the base member at three contact points so that the second movable member can move in a predetermined plane (XY plane, for example) on the base member. In this configuration, the second movable member can move along a reference plane defined by the three contact points on the base member.

On the other hand, the base member, the first movable member, and the second movable member are connected to each other via the two drive units. In this case, no problem occurs when the actual dimension of a connection path in the optical axis direction in which the base member, the first movable member, and the second movable member are connected has a designed value.

However, not only does the actual dimension often contain an error, but also an error may occur due to deterioration with age and other factors.

When the connection path from the base member through the first drive unit, the first movable member, and the second drive unit to the second movable member contains any of the errors described above, any of the plurality of the above elements deforms to absorb the error. Under certain circumstances, an undue load may act on the first or second drive unit, possibly resulting in reduction in shake correction performance of the drive unit.

Such a situation is also taken as a situation in which the position of the second movable member relative to the base member in the optical axis direction is not only determined by the three contact points but also excessively constrained by another connection path, that is, an "over-constraint" situation. Such "over-constraint" prevents the shake correction unit from being smoothly driven.

Thus, it is desirable to provide a shake correction unit that can prevent such "over-constraint" and readily achieve a smooth shake correction action, and a technology related to the same.

A first embodiment of the invention is directed to a shake correction unit including a base member; a first movable member that moves relative to the base member in a first direction; a second movable member to which an imaging device is fixed, the second movable member moving relative to the first movable member in a second direction; a first drive unit provided between the base member and the first movable member, the first drive unit moving the base member and the first movable member relative to each other in the first direction; and a second drive unit provided between the first movable member and the second movable member, the second drive unit moving the first movable member and the second movable member relative to each other in the second direction. The second movable member is in contact with the base member at three contact points, and can move in parallel to a reference plane defined by the three contact points. The first drive unit is connected to the base member via a first elastic member capable of slightly deforming in a third direction perpendicular to the reference plane.

A second embodiment of the invention is directed to an imaging apparatus including a body and a shake correction unit provided in the body, the shake correction unit moving an imaging device to correct a shake. The shake correction unit includes a base member; a first movable member that moves relative to the base member in a first direction; a second movable member to which the imaging device is fixed, the second movable member moving relative to the first movable member in a second direction; a first drive unit provided between the base member and the first movable member, the first drive unit moving the base member and the first movable member relative to each other in the first direction; and a second drive unit provided between the first movable member and the second movable member, the second drive unit moving the first movable member and the second movable member relative to each other in the second direction. The second movable member is in contact with the base member at three contact points, and can move in parallel to a reference plane defined by the three contact points. The first drive unit is connected to the base member via an elastic member capable of slightly deforming in a third direction perpendicular to the reference plane.

A third embodiment of the invention is directed to a shake correction unit including a base member; a first movable member that moves relative to the base member; a second movable member to which an imaging device is fixed, the second movable member moving relative to the first movable member; a first drive unit provided between the base member and the first movable member, the first drive unit moving the base member and the first movable member relative to each other in a first direction; and a second drive unit provided between the first movable member and the second movable member, the second drive unit moving the first movable member and the second movable member relative to each other in a second direction. The second movable member is in contact with the base member at three contact points, and can move in parallel to a reference plane defined by the three contact points. In a connection path in which a plurality of elements are connected, the plurality of elements including the base member, the first drive unit, the first movable member, the second drive unit, and the second movable member, any pair of adjacent two elements are connected to each other via an elastic member capable of slightly deforming in a third direction perpendicular to the reference plane.

A fourth embodiment of the invention is directed to an imaging apparatus including a body and a shake correction unit provided in the body, the shake correction unit moving an imaging device to correct a shake. The shake correction unit includes a base member; a first movable member that moves relative to the base member; a second movable member to which the imaging device is fixed, the second movable member moving relative to the first movable member; a first drive unit provided between the base member and the first movable member, the first drive unit moving the base member and the first movable member relative to each other in a first direction; and a second drive unit provided between the first movable member and the second movable member, the second drive unit moving the first movable member and the second movable member relative to each other in a second direction. The second movable member is in contact with the base member at three contact points, and can move in parallel to a reference plane defined by the three contact points. In a connection path in which a plurality of elements are connected, the plurality of elements including the base member, the first drive unit, the first movable member, the second drive unit, and the second movable member, any pair of adjacent two elements are connected to each other via an elastic member capable of slightly deforming in a third direction perpendicular to the reference plane.

According to the first and second embodiments of the invention, the first elastic member provided between the first drive unit and the base member slightly deforms in the third direction (the direction perpendicular to the reference plane), whereby a dimensional error of the connection path in the third direction, in which the base member, the first movable member, and the second movable member are connected, is absorbed. It is therefore possible to prevent "over-constraint" and readily achieve a smooth shake correction action.

According to the third and fourth embodiments of the invention, in the connection path in which a plurality of elements including the base member, the first drive unit, the first movable member, the second drive unit, and the second movable member are connected, the elastic member provided between any pair of adjacent two elements can slightly deform in the third direction (the direction perpendicular to the reference plane). A dimensional error of the connection path in the third direction is therefore absorbed. It is therefore possible to prevent "over-constraint" and readily achieve a smooth shake correction action.

BRIEF DESCRIPTION OF THE DRAWINGS

FIG. 14 is a perspective view showing how a base plate is connected to a first drive unit via an elastic member.

DESCRIPTION OF THE PREFERRED EMBODIMENTS

Embodiments of the invention will be described below with reference to the drawings.

1. First Embodiment 1-1. Configuration Overview

Figure 1:
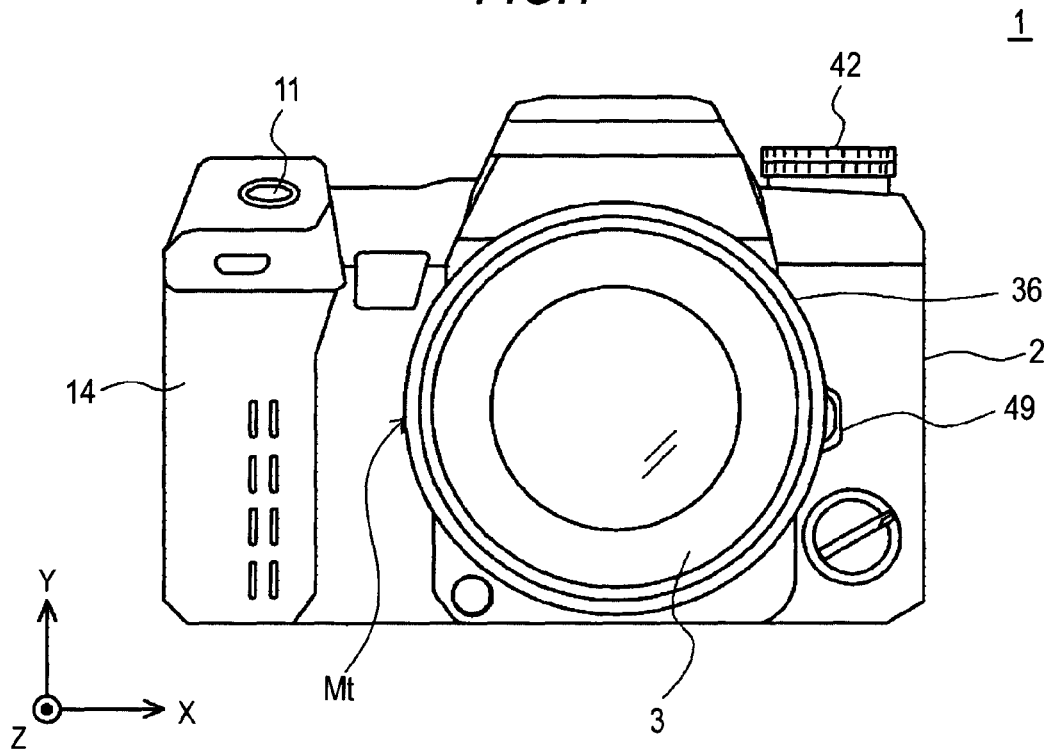
FIG. 1 is a front exterior view of an imaging apparatus.
Figure 2:
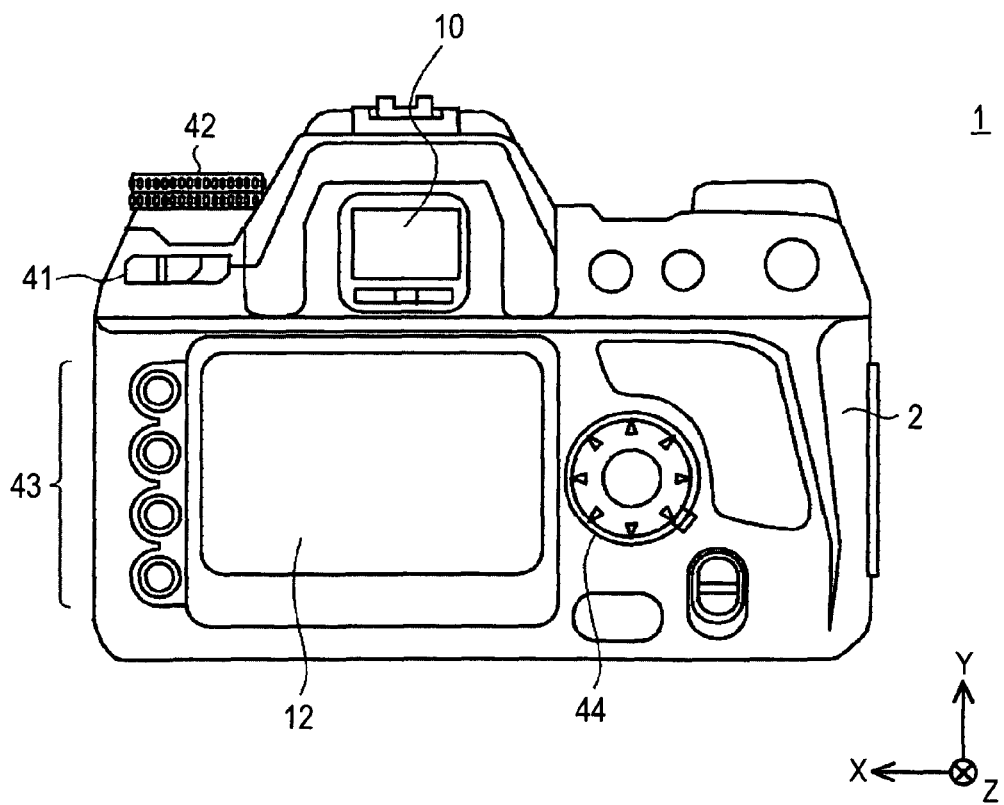
FIG. 2 is a rear exterior view of the imaging apparatus.

FIGS. 1 and 2 show the external configuration of an imaging apparatus 1 (1A) according to a first embodiment of the invention. FIG. 1 is a front exterior view of the imaging apparatus 1, and FIG. 2 is a rear exterior view of the imaging apparatus 1. The imaging apparatus 1 is configured as an interchangeable single-lens reflex digital camera.

As shown in FIG. 1, the imaging apparatus 1 includes a camera body 2. An interchangeable imaging lens unit (interchangeable lens) 3 can be attached and detached to and from the camera body 2.

The imaging lens unit 3 primarily includes a lens barrel 36, and a lens group 37 (see FIG. 3), an aperture, and other parts provided in the lens barrel 36. The lens group 37 (imaging optical system) includes a focus lens that moves in the optical axis direction to change the focus position.

The camera body 2 includes an annular mount Mt that is disposed in a substantially central portion of the front side and to which the imaging lens unit 3 is attached, and an attaching and detaching button 49 that is disposed in the vicinity of the annular mount Mt and used to attach and detach the imaging lens unit 3.

The camera body 2 further includes a mode setting dial 42 in an upper right portion of the front side. Operating the mode setting dial 42 allows a variety of modes provided in the camera (including a variety of imaging modes (such as a portrait imaging mode, a scenery imaging mode, and a fully automatic imaging mode), a reproducing mode for reproducing a captured image, and a communication mode for sending and receiving data to and from an external apparatus) to be set (switched).

The camera body 2 further includes a grip 14 that is disposed at the left end of the front side and gripped by a photographing user. A release button 11 for instructing the camera to start exposure is provided on the upper side of the grip 14. The grip 14 has a battery compartment and a card compartment provided therein. The battery compartment houses a lithium-ion battery or any other suitable battery as a power source of the camera, and the card compartment detachably houses a memory card for recording image data of captured images.

The release button 11 is a two-stage detection button capable of detecting two states, a half-pressed state (S1 state) and a fully-pressed state (S2 state). When the release button 11 is pressed halfway into the S1 state, preparation actions (an AF control action and an AE control action, for example) for capturing a still image of a subject to be recorded (final captured image) are carried out. When the release button 11 is further pressed into the S2 state, actions of capturing the final captured image (a series of actions including exposing an imaging device 5 (which will be described later) to an image of the subject (an optical image of the subject), and performing predetermined image processing on an image signal obtained by the exposure action) are carried out.

In FIG. 2, a finder window (eyepiece window) 10 is provided in a substantially upper central portion of the back side of the camera body 2. When taking a photograph, the user can look into the finder window 10 and visually recognize the optical image of the subject guided through the imaging lens unit 3 to determine a composition. That is, the optical finder can be used to determine a composition.

In FIG. 2, a backside monitor 12 is provided in a substantially central portion of the back side of the camera body 2. The backside monitor 12 is, for example, a color liquid crystal display (LCD). The backside monitor 12 can, for example, display a menu screen for setting imaging and other conditions, and reproduce and display in the reproducing mode a captured image recorded on the memory card.

A main switch 41 is provided to the upper left of the backside monitor 12. The main switch 41 includes a two-contact-point slidable switch. When the contact is set to a left "OFF" position, the power source is turned off, whereas when the contact is set to a right "ON" position, the power source is turned on.

A direction selectable key 44 is provided to the right of the backside monitor 12. The direction selectable key 44 has an annular operation button, and can detect four directional pressing operations on the operation button, up, down, right, and left, and another four directional pressing operations on the operation button, upper right, upper left, lower right, and lower left. The direction selectable key 44 can detect the pressing operation on a center push button as well as the above eight directional pressing operations.

A group of setting buttons 43 is provided to the left of the backside monitor 12. The group of setting buttons 43 includes a plurality of buttons for performing various operations including setting parameters in the menu screen and deleting images.

Figure 3:
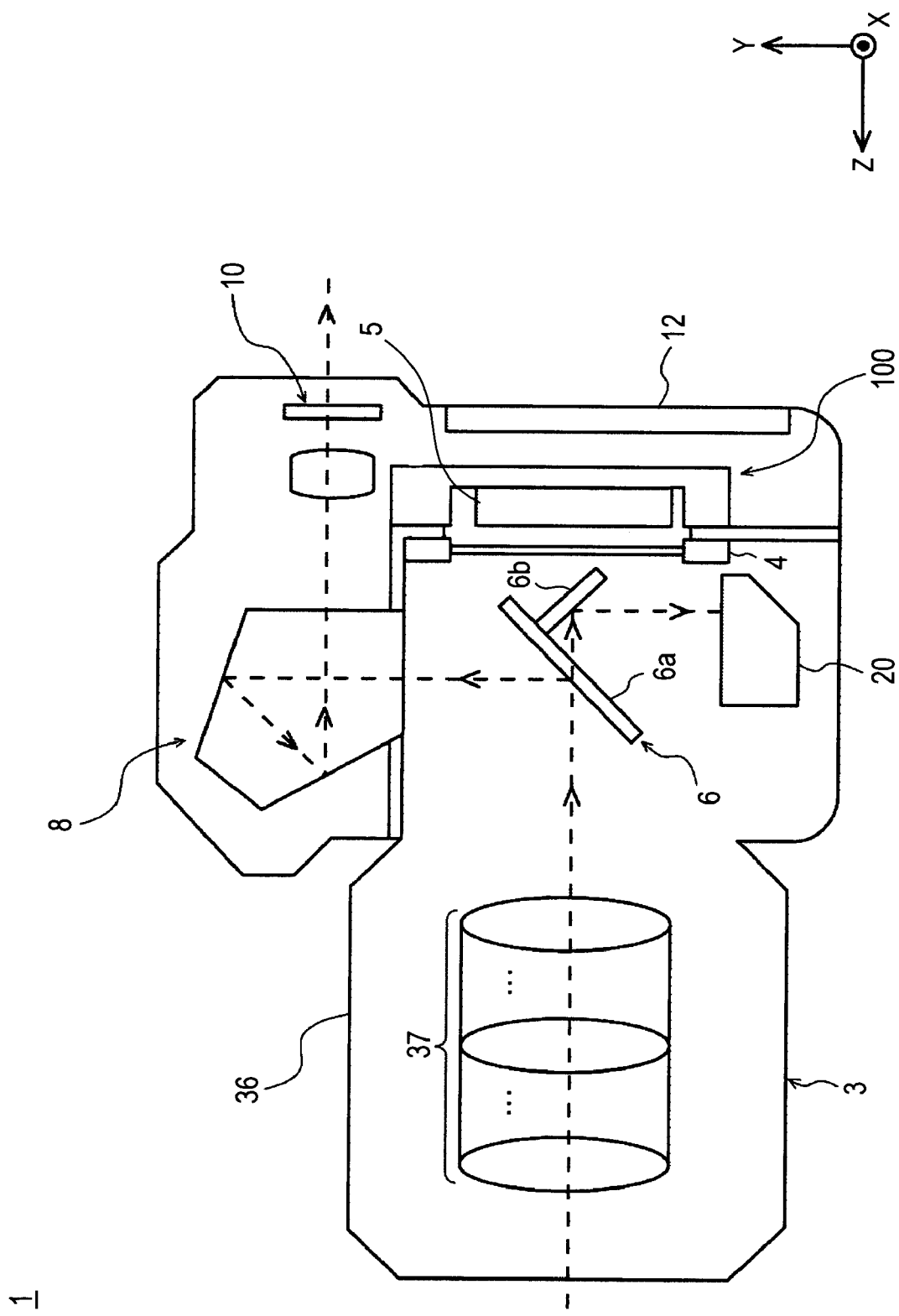
FIG. 3 is a cross-sectional view showing the internal configuration of the imaging apparatus.

FIG. 3 is a cross-sectional view showing the internal configuration of the imaging apparatus 1. FIG. 3 shows a mirror-down state.

As shown in FIG. 3, a mirror mechanism 6 is provided on an optical path (imaging optical path) between the imaging lens unit 3 and the imaging device 5. The mirror mechanism 6 includes a primary mirror 6a (primary reflection surface) that reflects the light having passed through the imaging optical system upward. Part or all of the primary mirror 6a includes, for example, a half-silvered mirror, which transmits part of the light having passed through the imaging optical system. The mirror mechanism 6 also includes a secondary mirror 6b (secondary reflection surface) that reflects the light having passed through the primary mirror 6a downward. The light reflected downward off the secondary mirror 6b is guided to and incident on an AF module 20, and used for phase-difference AF operation.

The mirror mechanism 6 takes the mirror-down state before the release button 11 is pressed into the fully-pressed state S2 (that is, in the composition determination process) (FIG. 3). In this process, a subject image having passed through the imaging lens unit 3 is reflected upward off the primary mirror 6a, and the reflected light, which serves as an observation light beam, is incident on a pentaprism 8. The incident light beam is further reflected in the pentaprism 8, passes through an ocular lens and the finder window 10, and reaches the eye of the photographing user. A composition is thus determined by using the optical view finder (OVF).

Thereafter, when the release button 11 is pressed into the fully-pressed state S2, the mirror mechanism 6 is driven to take a mirror-up state, and the exposure action is initiated. Specifically, the primary mirror 6a and the secondary mirror 6b are lifted up not to block the light (subject image) having passed through the imaging optical system, whereby the light having passed through the imaging lens unit 3 is not reflected off the primary mirror 6a but travels to the imaging device 5 in synchronization with the period during which a shutter 4 is open. The imaging device 5 carries out opto-electric conversion to produce an image signal representing the subject based on the received light beam. As described above, the light beam from the subject (subject image) passes through the imaging lens unit 3 and is guided to the imaging device 5, whereby a captured image (captured image data) representing the subject is obtained.

The imaging device (a CCD sensor in the embodiment (sometimes simply referred to as a CCD)) 5 is a light receiving device that carries out opto-electric conversion to convert an optical image of the subject (subject image) having passed through the imaging lens unit 3 into an electric signal, and produces and acquires an image signal representing a final captured image (image signal to be recorded). Specifically, the imaging device 5 is exposed to the subject image focused on the light receiving surface (accumulates electric charge in the opto-electric conversion process) and produces an image signal representing the subject image.

The image signal acquired by the imaging device 5 undergoes predetermined analog signal processing in a signal processing unit, and the image signal having undergone the analog signal processing is converted into digital image data (image data) in an A/D conversion circuit. The resultant digital image data is inputted to a digital signal processing circuit. The digital signal processing circuit performs a variety of digital signal processing operations (such as black-level correction, white balancing (WB), and γ-correction) on the digital image data to produce image data representing the final captured image. The produced image data are recorded on the memory card.

The imaging apparatus 1 (1A) further includes a shake correction unit 100 (100A) that performs shake correction. The shake correction unit 100 is disposed in the camera body 2. More specifically, the shake correction unit 100 is fixed to a predetermined member (a mirror box, for example) in the camera body 2. The shake correction unit 100 can move the imaging device 5 in a plane perpendicular to the optical axis of the imaging lens unit 3. The shake correction unit 100 moves the imaging device 5 so that the shake detected by a shake detection sensor (such as a gyroscopic sensor) in the imaging apparatus 1 is canceled. Such optical shake correction control allows the imaging apparatus 1 to capture an image (such as a final captured image) with the shake (such as a shake caused by hands) reduced.

The configuration and other features of the shake correction unit 100 will be described below in detail.

1-2. Overview of Shake Correction Mechanism

Figure 4:
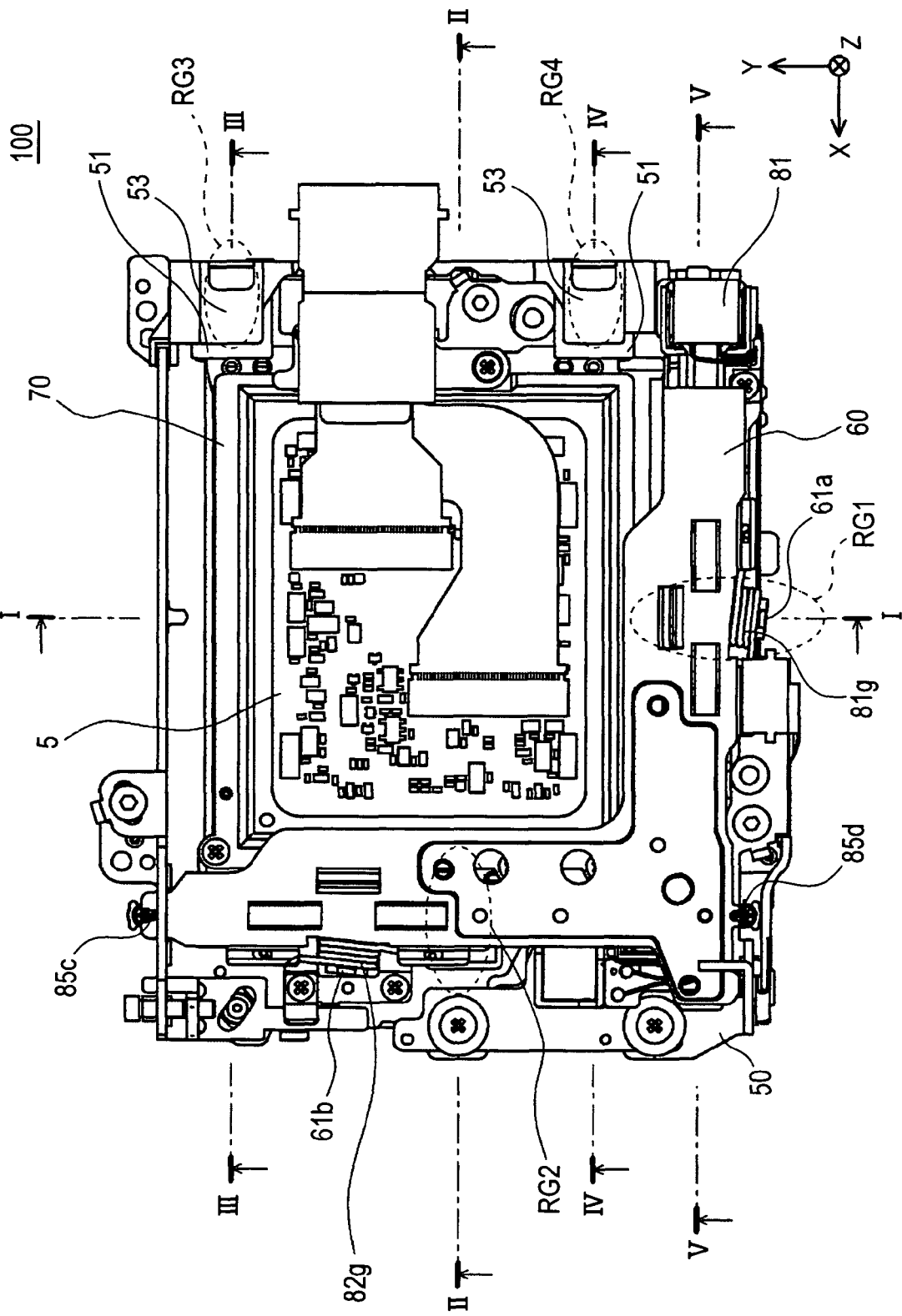
FIG. 4 shows a shake correction unit viewed from the rear (rear view)
Figure 5:
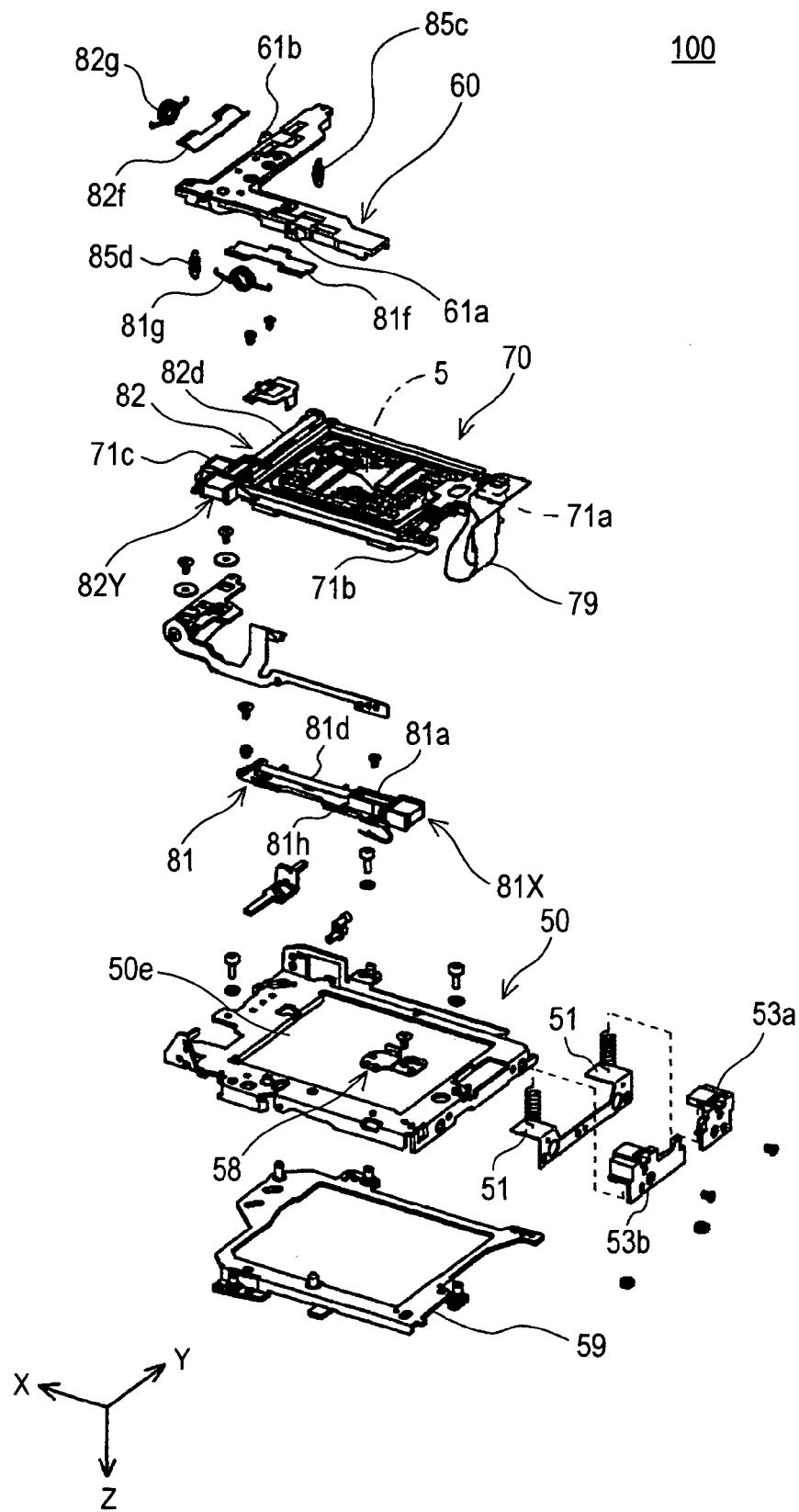
FIG. 5 is an exploded perspective view of the shake correction unit.
Figure 6:
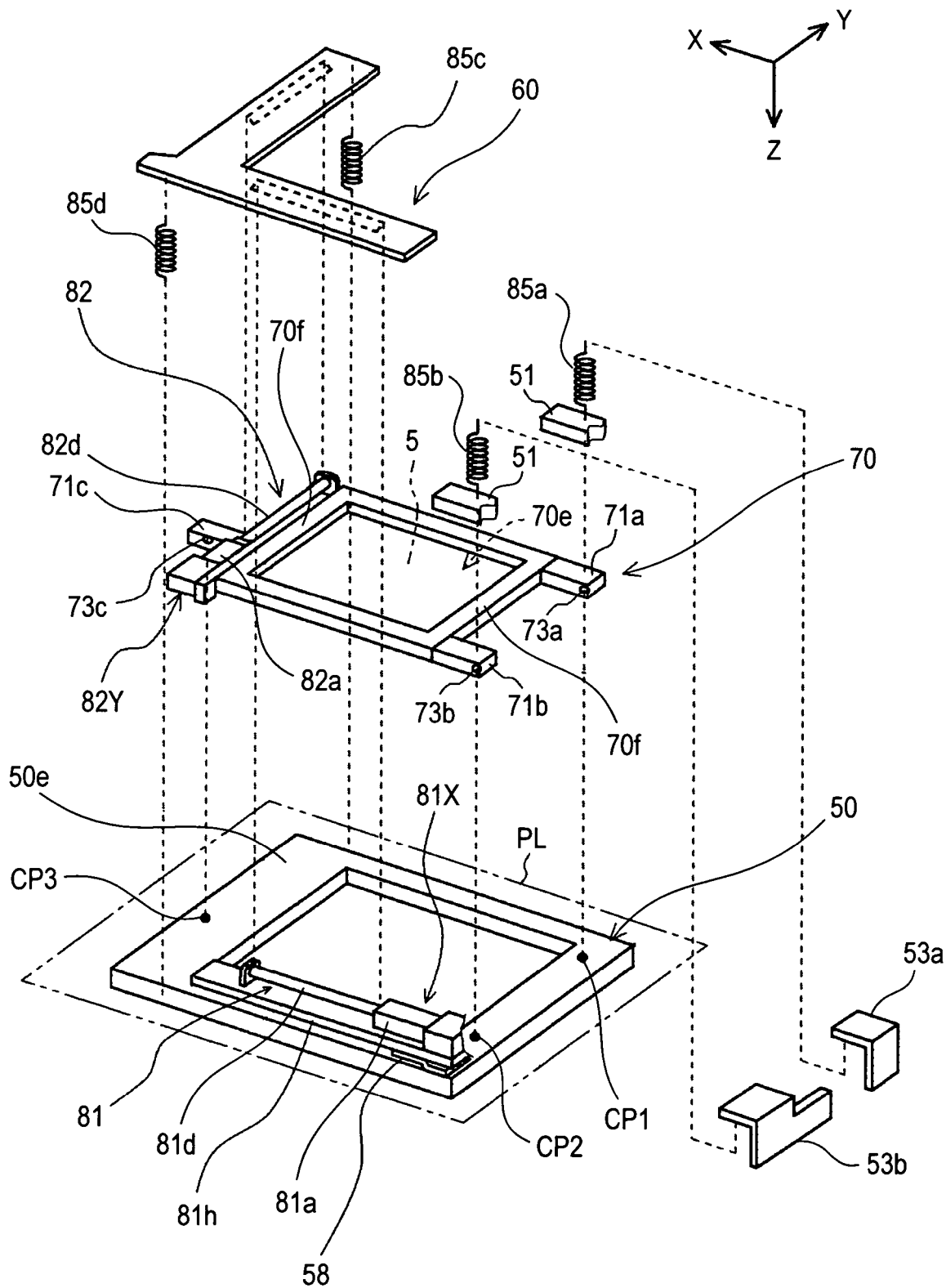
FIG. 6 is a schematic perspective view showing the components in part of FIG. 5.
Figure 7:
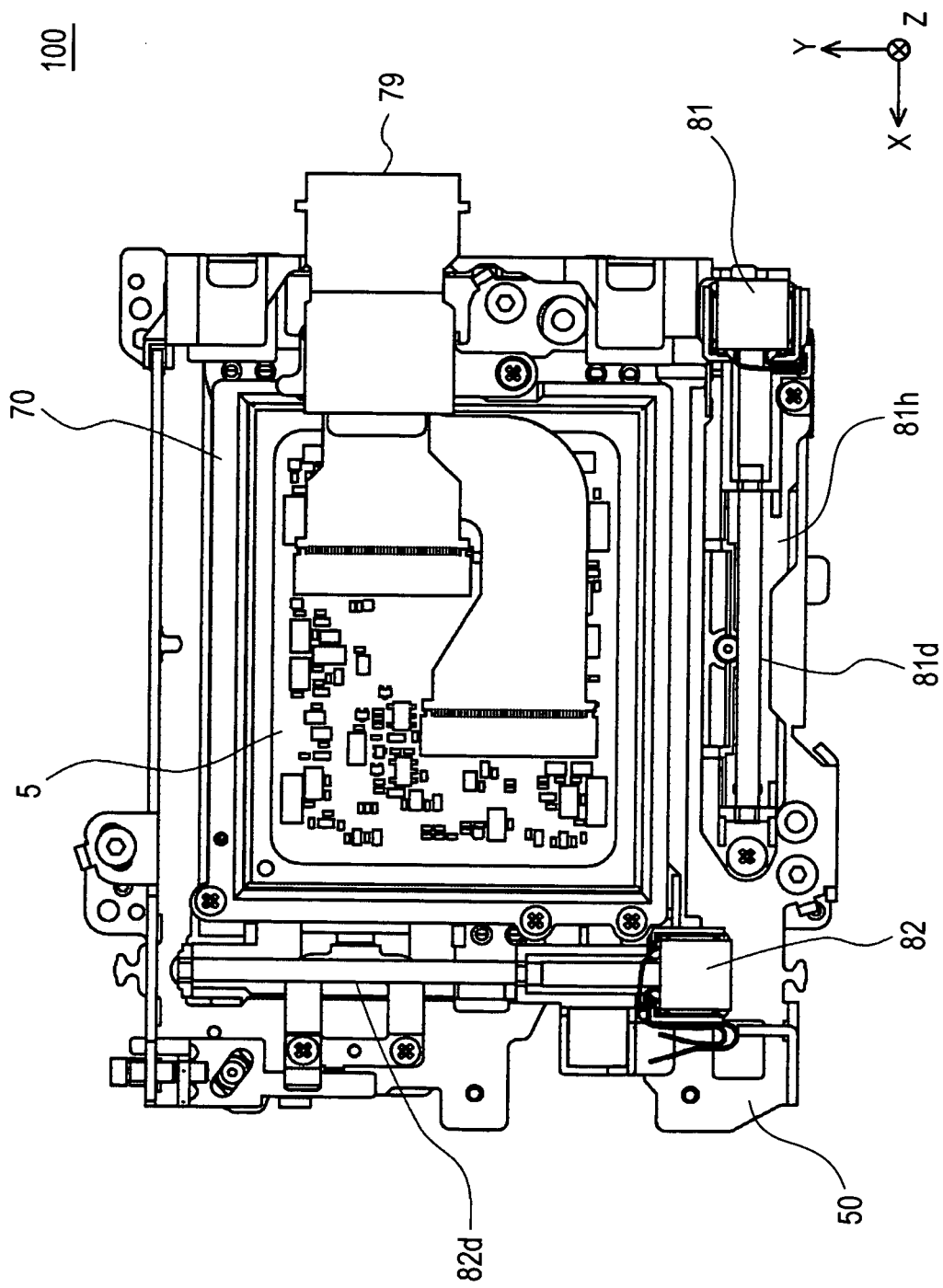
FIG. 7 shows the shake correction unit from which a first slider is removed.
Figure 8:
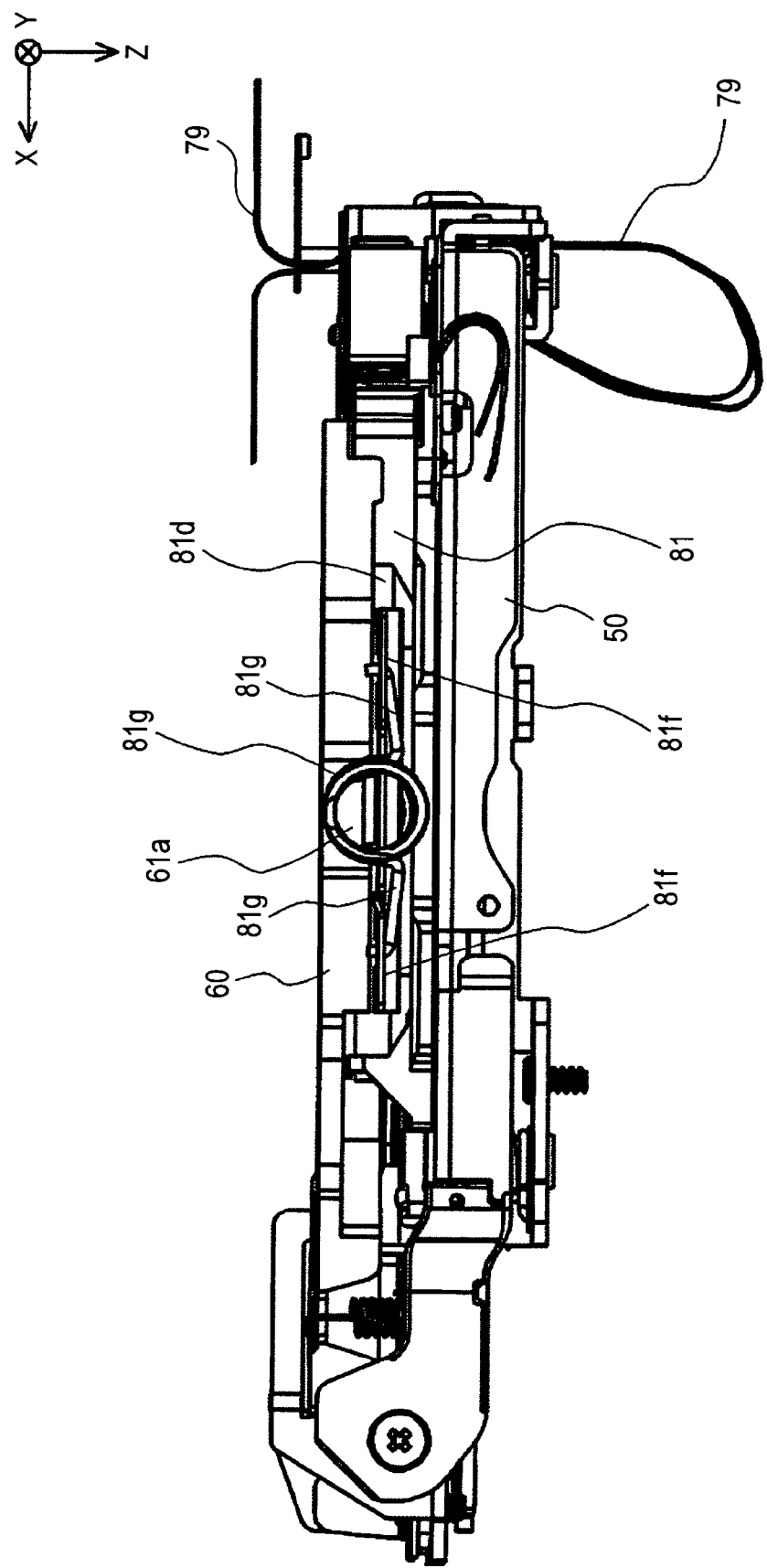
FIG. 8 shows the shake correction unit viewed from the bottom (−Y side) (bottom view)
Figure 9:
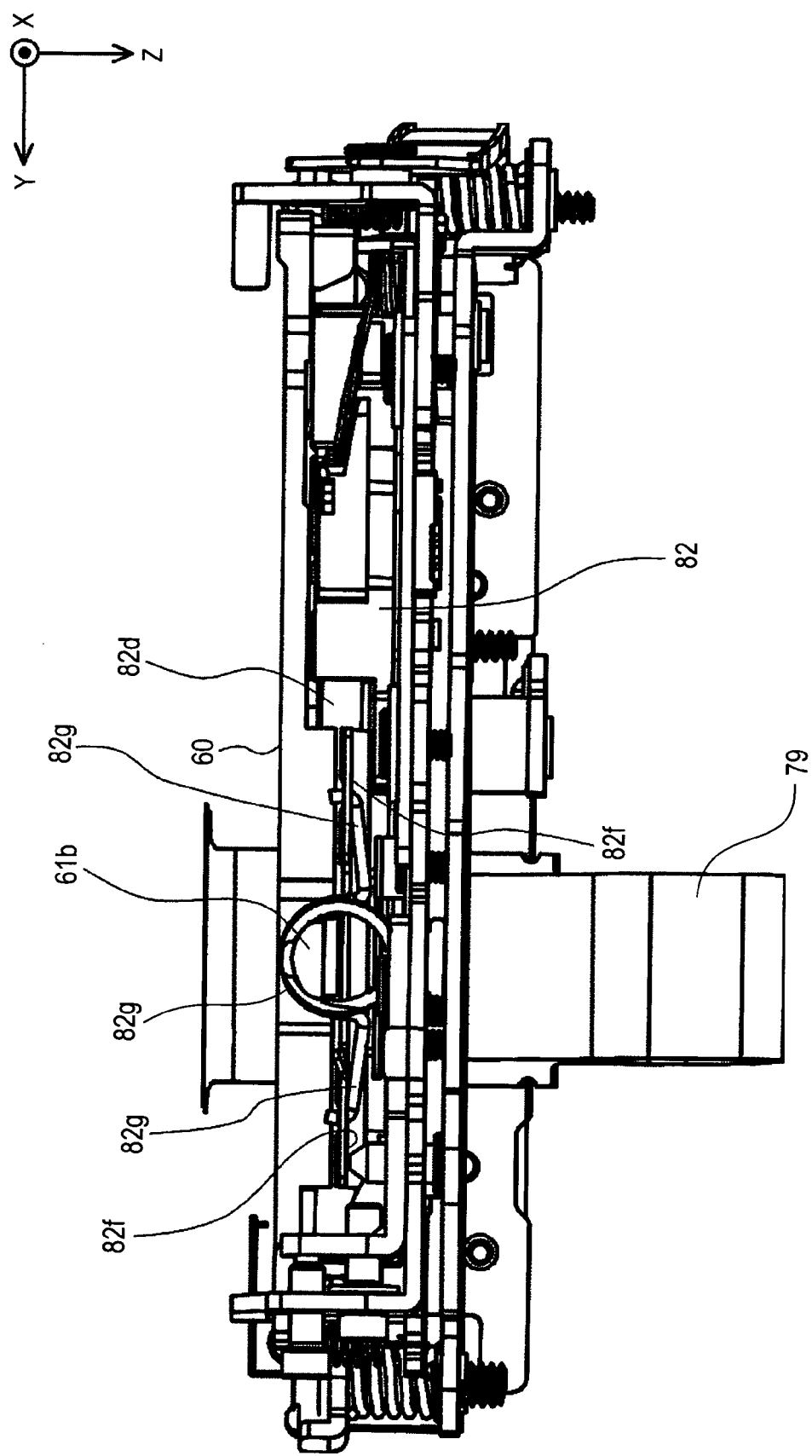
FIG. 9 shows the shake correction unit viewed from a side (+X side) (side view)
Figure 10:
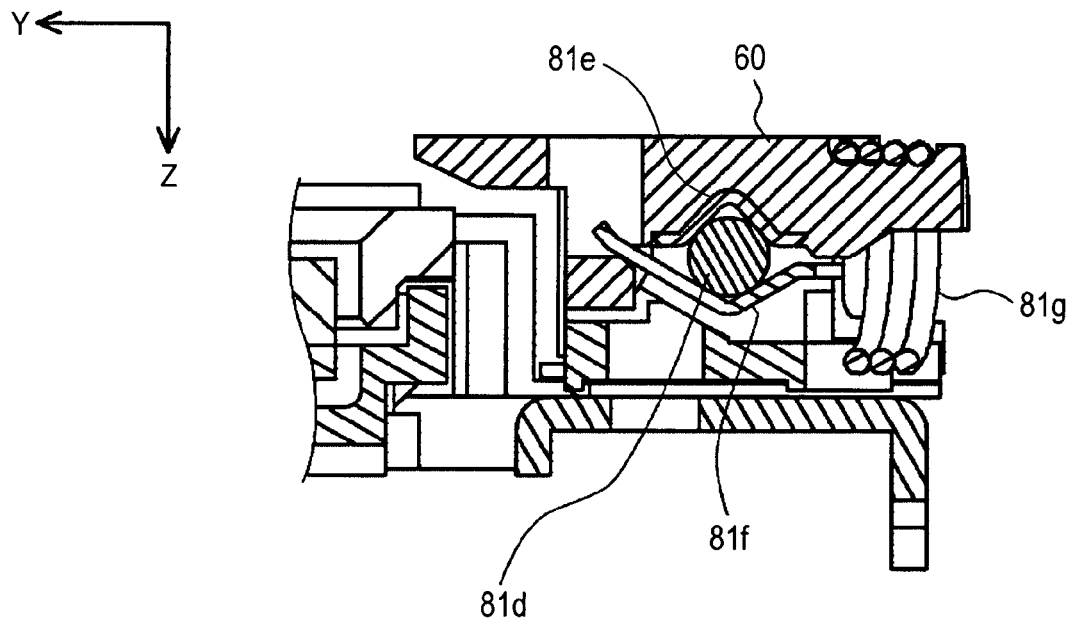
FIG. 10 is an enlarged view showing part of the I-I cross section in FIG. 4 (an area RG1 and its vicinity)
Figure 11:
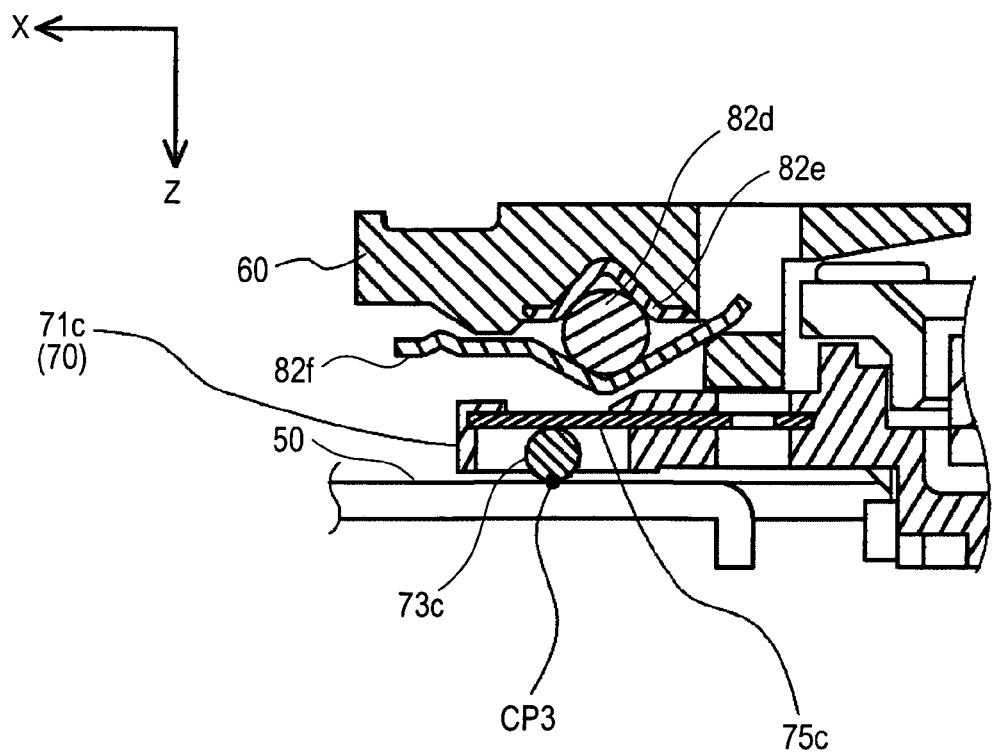
FIG. 11 is an enlarged view of part of the II-II cross section in FIG. 4 (an area RG2 and its vicinity)
Figure 12:
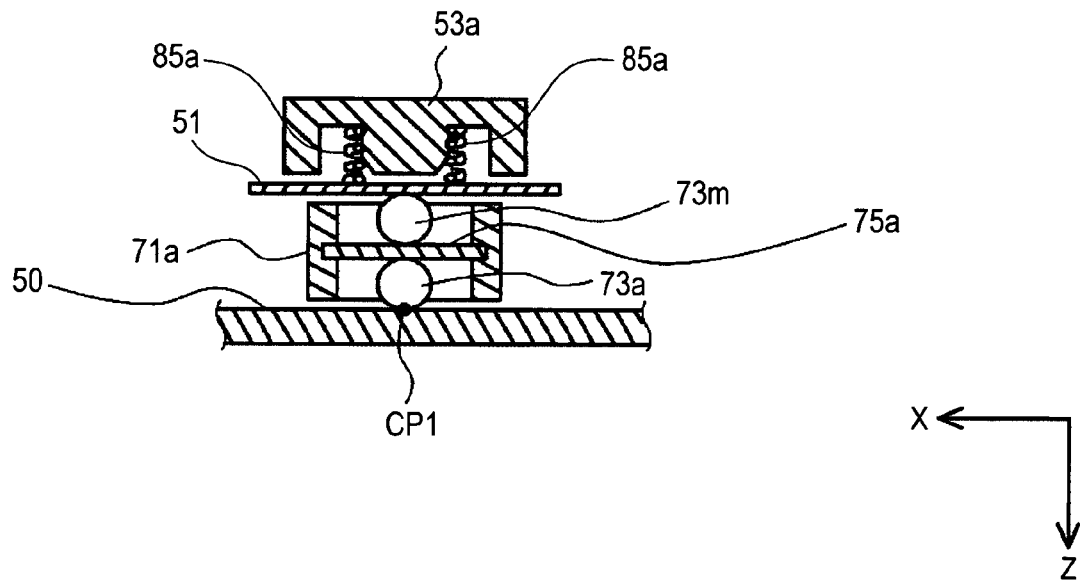
FIG. 12 is an enlarged view of part of the III-III cross section in FIG. 4 (an area RG3 and its vicinity)
Figure 13:
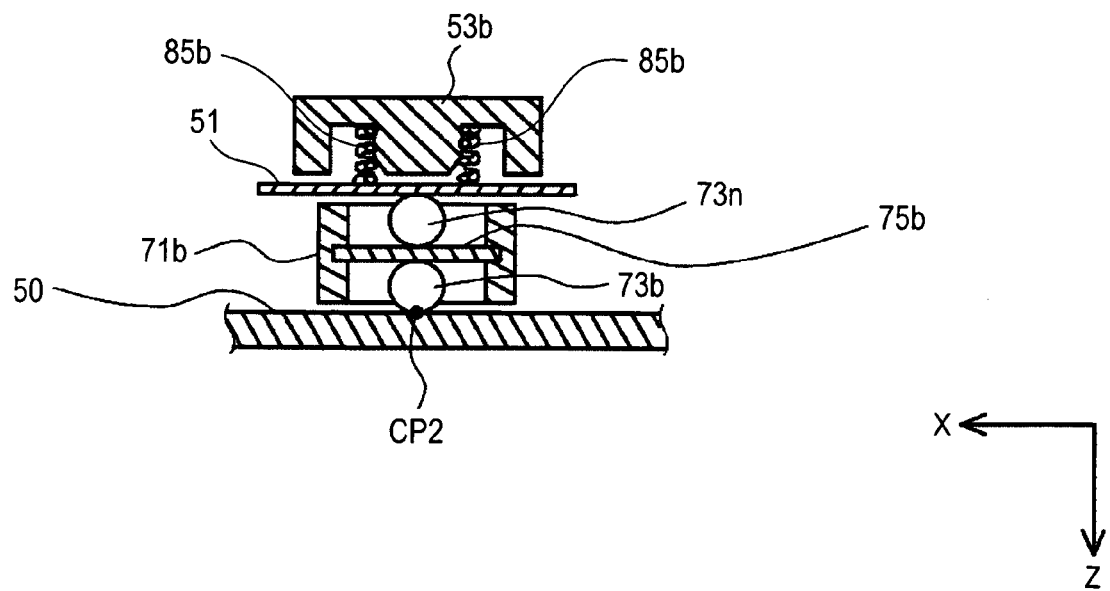
FIG. 13 is an enlarged view of part of the IV-IV cross section in FIG. 4 (an area RG4 and its vicinity)

FIG. 4 shows the shake correction unit 100 viewed from the rear (rear view). FIG. 5 is an exploded perspective view of the shake correction unit 100. FIG. 6 is a schematic perspective view showing the components in part of FIG. 5. The components shown in FIG. 6 are drawn in their simplified forms. FIG. 7 shows the shake correction unit 100 similar to that shown in FIG. 4 but showing no first slider 60. FIG. 8 shows the shake correction unit 100 viewed from the bottom (−Y side) (bottom view), and FIG. 9 shows the shake correction unit 100 viewed from a side (+X side) (side view). FIG. 10 is a cross-sectional view showing part of the I-I cross section in FIG. 4 (an area RG1 and its vicinity). FIG. 11 is an enlarged view of part of the II-II cross section in FIG. 4 (an area RG2 and its vicinity). FIG. 12 is an enlarged view of part of the III-III cross section in FIG. 4 (an area RG3 and its vicinity). FIG. 13 is an enlarged view of part of the IV-IV cross section in FIG. 4 (an area RG4 and its vicinity).

As shown in FIGS. 5 and 6, the shake correction unit 100 includes a base plate (sometimes referred to as a base member) 50, a first slider (sometimes referred to as a first movable member) 60, and a second slider (sometimes referred to as a second movable member) 70. The first slider 60 is a substantially L-shaped, plate-like member, and the base plate 50 and the second slider 70 are substantially rectangular, substantially plate-like members. A hollow portion 50e is provided in a substantially central portion of the base plate 50, and a hollow portion 70e is provided in a substantially central portion of the second slider 70.

The shake correction unit 100 further includes a first drive unit 81 and a second drive unit 82. The first drive unit 81 is disposed between the base plate 50 and the first slider 60. The first drive unit 81 moves the base plate 50 and the first slider 60 relative to each other in the X direction. The second drive unit 82 is disposed between the first slider 60 and the second slider 70. The second drive unit 82 moves the first slider 60 and the second slider 70 relative to each other in the Y direction.

The base plate 50 is fixed to the camera body 2 via an attachment fitting 59. The base plate 50 is connected to the first slider 60 via the first drive unit 81, and the first slider 60 is connected to the second slider 70 via the second drive unit 82. The imaging device 5 is fixed to the second slider 70. Specifically, the imaging device 5 fits into the hollow portion 70e of the second slider 70 and is fastened thereto by using screws. The imaging surface of the imaging device 5 is oriented toward the +Z side (subject side). Electric connection terminals provided on the imaging device 5 are electrically connected to electric connection terminals provided in the camera body 2 via a flexible substrate 79 and other components. The electric signal (image signal) acquired by the imaging device 5 is transferred through the flexible substrate 79 and other components to the digital signal processing circuit and other circuits in the camera body 2.

Driving the first drive unit 81 allows the first slider 60 to move relative to the base plate 50 in the X direction, and driving the second drive unit 82 allows the second slider 70 to move relative to the first slider 60 in the Y direction.

The first drive unit 81 is connected to the base plate 50 via an elastic member 58. The connection structure and other features will be described later in detail.

The first drive unit 81 includes a piezoelectric actuator 81X as a drive device. The piezoelectric actuator 81X has a drive section 81a including a piezoelectric device and a drive shaft 81d connected to the drive section 81a. The first drive unit 81 further includes an actuator holder 81h that holds the piezoelectric actuator 81X.

As also shown in FIG. 10, which is a cross-sectional view, an elongated metal plate 81e having a substantially V cross-sectional shape is provided over the drive shaft 81d. Similarly, an elongated metal plate 81f (see also FIG. 5) having a substantially V cross-sectional shape is provided under the drive shaft 81d. The metal plate 81e has been insert-molded in the +Z-side surface of the first slider 60 in such a way that one surface of the metal plate 81e is exposed, and the metal plate 81f is disposed on the opposite side (+Z side) of the drive shaft 81d to the metal plate 81e. The metal plates 81e and 81f sandwich the drive shaft 81d.

As also shown in FIG. 8, which is a bottom view, the metal plate 81f is pressed against the first slider 60 by a twisted, coiled spring 81g through which a −Y-side protrusion 61a (see also FIG. 5) of the first slider 60 passes, whereby the metal plate 81f is integrated with the first slider 60. That is, the metal plates 81e and 81f are integrated with the first slider 60. It is noted, however, that the metal plates 81e and 81f are in frictional contact with the drive shaft 81d and the magnitude of the frictional force is roughly at a level that allows the metal plates 81e, 81f to slide along the drive shaft 81d.

As described above, the drive shaft 81d of the piezoelectric actuator 81X is frictionally connected to the first slider 60. In the configuration described above, successively applying predetermined drive pulses (sawtooth drive pulses, for example) to the drive section 81a of the piezoelectric actuator 81X allows the first slider 60 to move relative to the base plate 50 in the X direction. For example, at the rising portion of any of the sawtooth drive pulses where the speed is relatively low, the drive shaft 81d moves at a relatively low speed in a predetermined direction, and the metal plates 81e and 81f follow the drive shaft 81d and move accordingly. At the following steeply falling portion of the sawtooth drive pulse, the drive shaft 81d moves in the direction opposite the predetermined direction (i.e., returns) at a relatively high speed, and the metal plates 81e and 81f slip on the drive shaft 81d. When the action described above is repeated, the metal plates 81e and 81f (i.e., the first slider 60) move relative to the base plate 50 in the predetermined direction. It is noted that the first slider 60 can be moved relative to the base plate 50 in the opposite direction by applying reverse drive pulses.

The second drive unit 82 (FIG. 6) is attached to the +X side of the second slider 70. The second drive unit 82 is glued and fixed to the side of the second slider 70 that is on the +X-side of the rectangular imaging device 5, and integrated with the second slider 70.

The second drive unit 82 includes a piezoelectric actuator 82Y as a drive device. The piezoelectric actuator 82Y has a drive section 82a including a piezoelectric device and a drive shaft 82d connected to the drive section 82a. The piezoelectric actuator 82Y is directly glued and fixed to the second slider 70.

As also shown in FIG. 11, which is a cross-sectional view, an elongated metal plate 82e having a substantially V cross-sectional shape is provided over the drive shaft 82d. Similarly, an elongated metal plate 82f (see also FIG. 5) having a substantially V cross-sectional shape is provided under the drive shaft 82d. The metal plate 82e has been insert-molded in the +Z-side surface of the first slider 60 in such a way that the surface of metal plate 82e is exposed, and the metal plate 82f is disposed on the opposite side (+Z side) of the drive shaft 82d to the metal plate 82e. The metal plates 82e and 82f sandwich the drive shaft 82d.

As also shown in FIG. 9, which is a side view, the metal plate 82f is pressed against the first slider 60 by a twisted, coiled spring 82g through which a +X-side protrusion 61b (see also FIG. 5) of the first slider 60 passes, whereby the metal plate 82f is integrated with the first slider 60. That is, the metal plates 82e and 82f are integrated with the first slider 60. It is noted, however, that the metal plates 82e and 82f are in frictional contact with the drive shaft 82d and the magnitude of the friction force is roughly at a level that allows the metal plates 82e, 82f to slide along the drive shaft 82d.

As described above, the drive shaft 82d of the piezoelectric actuator 82Y fixed to the second slider 70 is frictionally connected to the first slider 60. In the configuration described above, successively applying predetermined drive pulses to the drive section 82a of the piezoelectric actuator 82Y allows the second slider 70 to move relative to the first slider 60 in the Y direction. The principle on which the piezoelectric actuator 82Y is driven is the same as that on which the piezoelectric actuator 81X is driven.

As described above, the base plate 50 is connected to the first slider 60 via the first drive unit 81 so that they move relative to each other in the X direction. Similarly, the second slider 70 is connected to the first slider 60 via the second drive unit 82 so that they move relative to each other in the Y direction. As a result, the imaging device 5 fixed to the second slider 70 can move relative to the base plate 50 (and hence the camera body 2) in the X and Y directions.

Further, as shown in FIG. 6, the second slider 70 is in contact with the base plate 50 at three contact points CP1, CP2, and CP3. The second slider 70 can move in parallel to a reference plane PL defined by the three contact points CP1, CP2, and CP3. The reference plane PL is also taken as a plane containing the three points CP1, CP2, and CP3.

Specifically, the second slider 70 has three protrusions 71a, 71b, and 71c. The protrusions 71a and 71b protrude toward the −X side from a −X-side portion of a frame 70f that surrounds the hollow portion 70e of the second slider 70, and the protrusion 71c protrudes toward the +X side from a +X-side portion of the frame 70f, which surrounds the hollow portion 70e of the second slider 70. As also shown in FIG. 12, which is a cross-sectional view, a steel ball 73a is provided in the protrusion 71a. Similarly, as also shown in FIG. 13, which is a cross-sectional view, a steel ball 73b is provided in the protrusion 71b. Further, as also shown in FIG. 11, which is a cross-sectional view, a steel ball 73c is provided in the protrusion 71c.

First, the configuration of the steel ball 73c and its vicinity will be described with reference to FIG. 11 (a partial enlarged view of the II-II cross section).

As shown in FIG. 11, the steel ball 73c is sandwiched between the base plate 50 and a metal plate 75c insert-molded in the protrusion 71c of the second slider 70, and the ends of the steel ball 73c in the Z direction are in contact with the base plate 50 and the metal plate 75c, respectively. In particular, the steel ball 73c is in contact with the base plate 50 at the contact point CP3, and the protrusion 71c of the second slider 70 is supported by the steel ball 73c at the contact point CP3 on the base plate 50.

Further, as shown in FIG. 6 and other figures, a tensile coiled spring 85c is hooked to +Y-side end portions of the base plate 50 and the first slider 60 and disposed therebetween (between the base plate 50 and the first slider 60) Further, a tensile coiled spring 85d is hooked to −Y-side end portions of the base plate 50 and the first slider 60 and disposed therebetween. The tensile coiled springs 85c and 85d thus provide urging forces that press the second slider 70 against the base plate 50 by way of the first slider 60 and other components.

According to the configuration described above, in the vicinity of the protrusion 71c, the metal plate 75c, the steel ball 73c, and the base plate 50 are disposed in this order in the Z direction and in contact with the respective adjacent members without any gap therebetween (see FIG. 11). Accordingly, the second slider 70 is in contact with the -Z-side surface of the base plate 50 via the steel ball 73c at the contact point CP3. The position of the second slider 70 relative to the base plate 50 in the optical axis direction (Z direction) is thus restricted in the vicinity of the protrusion 71c.

Next, the configuration of the steel ball 73a and its vicinity will be described with reference to FIG. 12 (a partial enlarged view of the III-III cross section).

As shown in FIG. 12, an insert-molded metal plate 75a is disposed in the protrusion 71a of the second slider 70. The metal plate 75a is fixed in a substantially central position in the protrusion 71a in the Z direction. The steel ball 73a is provided on the +Z side (lower side in FIG. 12) of the metal plate 75a, and a steel ball 73m is provided on the −Z side (upper side in FIG. 12) of the metal plate 75a.

The −Z side of the steel ball 73m is in contact with a ball pressing plate 51 (which will be described below), and the +Z side of the steel ball 73m is in contact with the metal plate 75a. On the other hand, the −Z side of the steel ball 73a is in contact with the metal plate 75a, and the +Z side of the steel ball 73a is in contact with the base plate 50 at the contact point CP1. The protrusion 71a of the second slider 70 is thus supported by the steel ball 73a at the contact point CP1 on the base plate 50.

As also shown in FIGS. 5 and 6, the ball pressing plate 51 is disposed on the −Z side (upper side in FIGS. 5 and 6) of the protrusion 71a, and a ball pressing holder 53a is disposed on the −Z side of the ball pressing plate 51. The ball pressing holder 53a is fastened to the base plate 50 by screws. A compression coiled spring 85a is disposed between the ball pressing plate 51 and the ball pressing holder 53a. The compression coiled spring 85a, when compressed, has a length shorter than its natural length, and the reaction force of the compression coiled spring 85a causes the ball pressing plate 51 to be pressed toward the base plate 50. In other words, the compression coiled spring 85a provides an urging force that presses the second slider 70 against the base plate 50 by way of the ball pressing plate 51 and other components.

According to the configuration described above, in the vicinity of the protrusion 71a, the ball pressing plate 51, the steel ball 73m, the metal plate 75a, the steel ball 73a, and the base plate 50 are in contact with each other without any gap therebetween in this order in the Z direction, as shown in FIG. 12. Accordingly, the second slider 70 is in contact with the −Z-side surface of the base plate 50 via the steel ball 73a at the contact point CP1. The position of the second slider 70 relative to the base plate 50 in the optical axis direction (Z direction) is thus restricted in the vicinity of the protrusion 71a.

Further, the configuration of the steel ball 73b and its vicinity will be described with reference to FIG. 13 (a partial enlarged view of the IV-IV cross section). The configuration of the steel ball 73b and its vicinity is the same as that of the steel ball 73a and its vicinity.

As shown in FIG. 13, an insert-molded metal plate 75b is disposed in the protrusion 71b of the second slider 70. The metal plate 75b is fixed in a substantially central position in the protrusion 71b in the Z direction. The steel ball 73b is provided on the +Z side (lower side in FIG. 13) of the metal plate 75b, and a steel ball 73n is provided on the −Z side (upper side in FIG. 13) of the metal plate 75b.

The −Z side of the steel ball 73n is in contact with the ball pressing plate 51, and the +Z side of the steel ball 73n is in contact with the metal plate 75b. On the other hand, the −Z side of the steel ball 73b is in contact with the metal plate 75b, and the +Z side of the steel ball 73b is in contact with the base plate 50 at the contact point CP2. The protrusion 71b of the second slider 70 is thus supported by the steel ball 73b at the contact point CP2 on the base plate 50.

A ball pressing holder 53b is disposed on the −Z side of the ball pressing plate 51 (see also FIGS. 5 and 6). The ball pressing holder 53b is fastened to the base plate 50 by screws. A compression coiled spring 85b is disposed between the ball pressing plate 51 and the ball pressing holder 53b. The compression coiled spring 85b, when compressed, has a length shorter than its natural length, and the reaction force of the compression coiled spring 85b causes the ball pressing plate 51 to be pressed toward the base plate 50. In other words, the compression coiled spring 85b provides an urging force that presses the second slider 70 against the base plate 50 by way of the ball pressing plate 51 and other components.

According to the configuration described above, in the vicinity of the protrusion 71b, the ball pressing plate 51, the steel ball 73n, the metal plate 75b, the steel ball 73b, and the base plate 50 are disposed in this order in the Z direction and in contact with the respective adjacent members without any gap therebetween, as shown in FIG. 13. Accordingly, the second slider 70 is in contact with the −Z-side surface of the base plate 50 via the steel ball 73b at the contact point CP2. The position of the second slider 70 relative to the base plate 50 in the optical axis direction (Z direction) is thus restricted in the vicinity of the protrusion 71b.

As described above, the position of the second slider 70 relative to the base plate 50 in the optical axis direction (Z direction) is restricted in the vicinity of each of the protrusions 71a, 71b, and 71c. The position of the imaging device 5 fixed to the second slider 70 is therefore restricted in the optical direction. In other words, the position of the imaging device 5 in the optical direction is stably maintained.

The frictional force at the contact point CP1 between the steel ball 73a and the base plate 50 is very small, and the frictional force at the contact point CP2 between the steel ball 73b and the base plate 50 is very small. The frictional force at the contact point CP3 between the steel ball 73c and the base plate 50 is also very small. The second slider 70 and the base plate 50 can therefore smoothly move relative to each other.

As a result, the second slider 70 can smoothly move relative to the base plate 50 in the X and Y directions, while the position of the second slider 70 is fixed in the Z direction (optical axis direction).

1-3. Configuration of First Drive Unit 81 and Its Vicinity

As described above, the second slider 70 is connected to the first slider 60 via the second drive unit 82 (see FIGS. 6 and 11 and other figures). Specifically, the second drive unit 82 is glued and fixed to the second slider 70, and the second drive unit 82 is connected to the first slider 60 via the drive shaft 82d and the metal plates 82e and 82f. Plainly stated, the second slider 70 is rigidly fixed to the first slider 60 in the Z direction.

On the other hand, the first slider 60 is connected to the base plate 50 via the first drive unit 81, as described above (see FIGS. 6 and 10 and other figures).

Specifically, the first drive unit 81 is connected to the first slider 60 via the drive shaft 81d and the metal plates 81e and 81f. In other words, the first slider 60 is frictionally connected to the first drive unit 81 via the drive shaft 81d of the piezoelectric actuator 81X.

In particular, the first drive unit 81 is connected to the base plate 50 via the elastic member 58. Specifically, the actuator holder 81h that holds the piezoelectric actuator 81X is connected to the base plate 50 via the elastic member 58, as shown in FIG. 14 and other figures. That is, the first drive unit 81 is connected to the base plate 50 in such a way that the first drive unit 81 can slightly shift in the Z direction. The connection structure and other features will be described below in detail.

Figure 15:
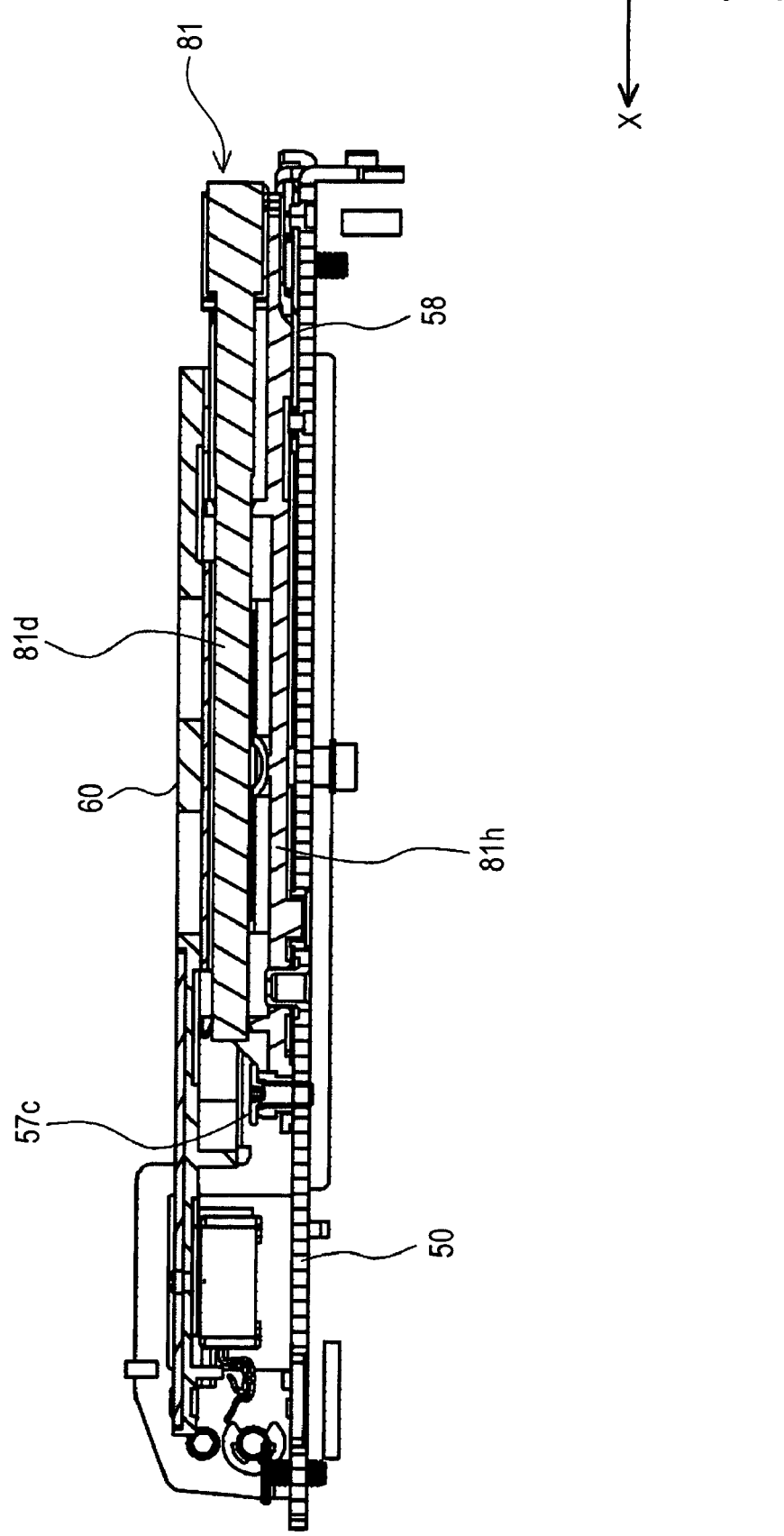
FIG. 15 is a cross-sectional view showing the V-V cross section in FIG. 4.
Figure 16:
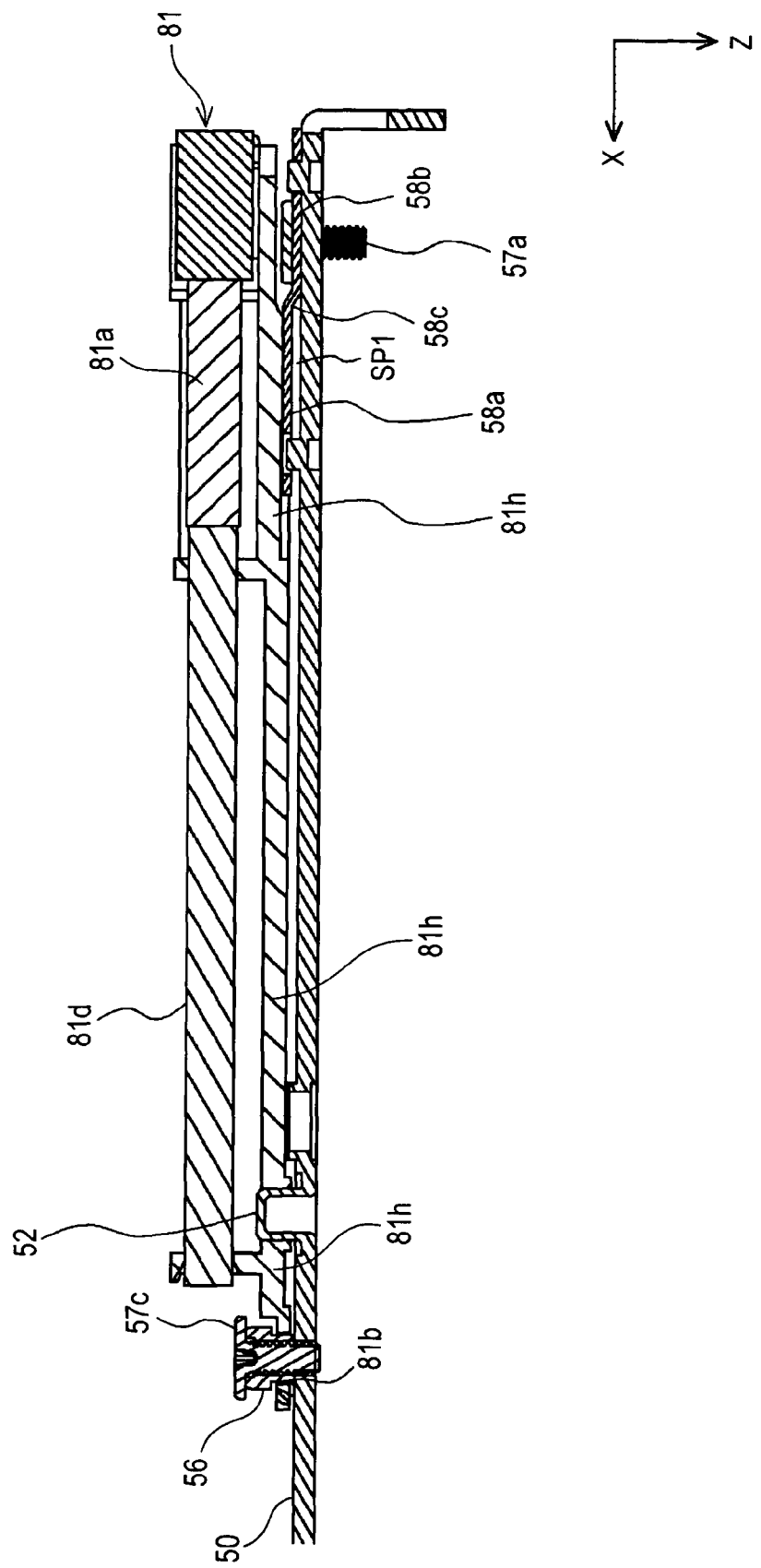
FIG. 16 is an enlarged view of part of FIG. 15 (the first drive unit and its vicinity)
Figure 17:
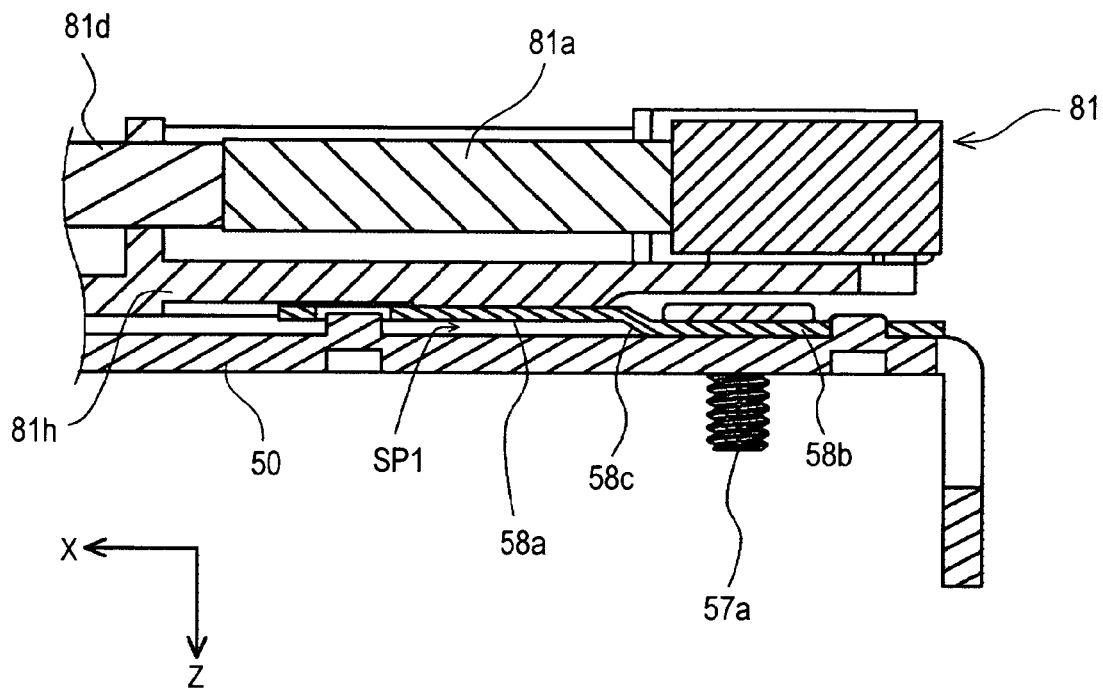
FIG. 17 is an enlarged view showing part of the right side in FIG. 16.
Figure 18:
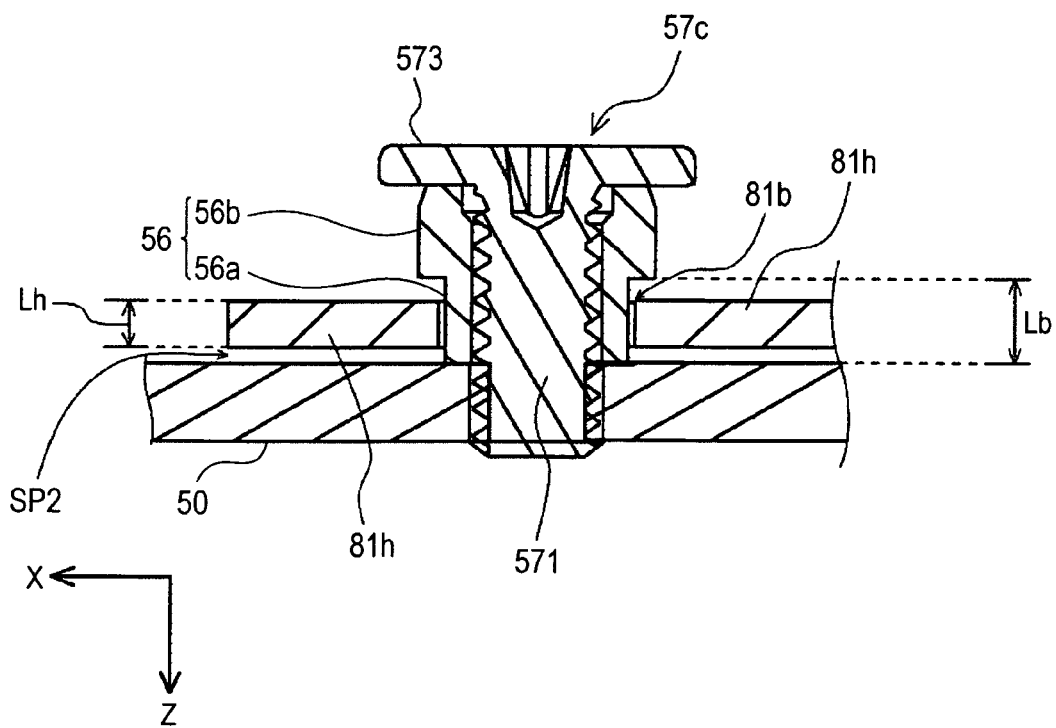
FIG. 18 is an enlarged view showing part of the left side in FIG. 16.
Figure 19:
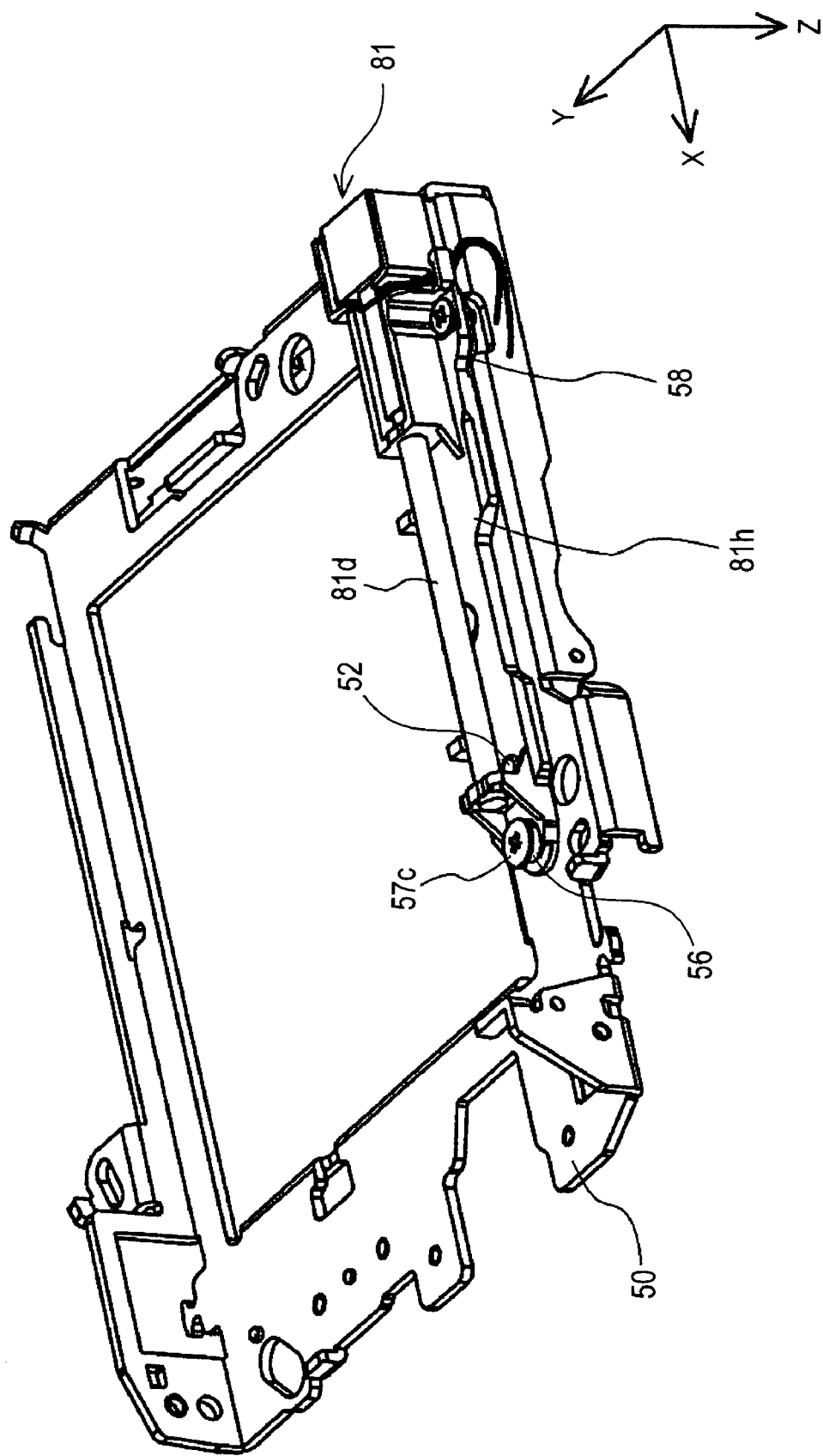
FIG. 19 is a perspective view showing the first drive unit attached to the base plate via the elastic member.

FIG. 14 is a perspective view showing how the base plate 50 is connected to the first drive unit 81 via the elastic member 58. FIG. 15 is a cross-sectional view showing the V-V cross section in FIG. 4. FIG. 16 is a partial enlarged view showing part of FIG. 15 (the first drive unit 81 and its vicinity). FIG. 17 is a partial enlarged view showing part of the right side in FIG. 16 (the elastic member 58 and its vicinity). FIG. 18 is a partial enlarged view showing part of the left side in FIG. 16 (a screw 57c and its vicinity). FIG. 19 is a perspective view showing the first drive unit 81 attached to the base plate 50 via the elastic member 58.

As shown in FIG. 14 and other figures, the piezoelectric actuator 81X is glued and fixed to the actuator holder 81h in the first drive unit 81. The actuator holder 81h in the first drive unit 81 is fixed to the base plate 50 via the elastic member 58.

The elastic member 58 is made of an elastic material (a metallic material, for example). The elastic member 58 is formed as a flat spring and can slightly deform in the Z direction, as shown in FIG. 17. Specifically, the elastic member 58 is formed as a step-shaped member having a step 58c substantially at the center of the elastic member 58 in the X direction. The elastic member 58 has two flat portions 58a and 58b, the positions of which in the Z direction differ from each other, and the step 58c connecting the two flat portions 58a and 58b. More specifically, the elastic member 58 has a flat portion 58a located to the +X side of the step 58c (sometimes referred to as a higher portion or a +X-side flat portion), and a flat portion 58b located to the −X side of the step 58c (sometimes referred to as a lower portion or a −X-side flat portion). The higher portion 58a is located to the −Z side (upper side in FIG. 14) of the lower portion 58b.

The higher portion 58a of the elastic member 58 is fastened to the actuator holder 81h by a screw 57b (see also FIG. 14) at one end (−X side) portion of the actuator holder 81h. The lower portion 58b of the elastic member 58 is fastened to the base plate 50 by a screw 57a. The first drive unit 81 (actuator holder 81h) is connected to the base plate 50 via the elastic member 58 in the configuration described above. Further, as shown in FIG. 17, the first drive unit 81 is connected to the base plate 50 with a gap SP1 present between the +Z-side surface of the first drive unit 81 and the base plate 50.

As described above, the first drive unit 81 is not rigidly fixed to the base plate 50, but is fixed to the base plate 50 via the elastic member 58. Specifically, the first drive unit 81 (the piezoelectric actuator 81X, the actuator holder 81h, and other components) can slightly shift in the Z direction when the elastic member 58 elastically deforms. In other words, the first drive unit 81 is allowed to shift in the Z direction.

As shown in FIG. 14, a substantially circular hole 81c is provided in the other side (+X side) portion of the actuator holder 81h. On the other hand, a substantially cylindrical protrusion 52 protruding toward the −Z side is provided on the base plate 50. The protrusion 52 fits (freely fits) into and passes through the substantially circular hole 81c provided in the actuator holder 81h.

A hole 81b located to the +X side of the hole 81c is further provided in the actuator holder 81h. As shown in FIG. 18, a screw 57c is fastened to the base plate 50 with a sleeve 56 sandwiched between the head 573 of the screw 57c and the base plate 50. Specifically, a shaft 571 of the screw 57c passes through the hollow portion of the substantially cylindrical sleeve 56 and hence the hole 81b provided in the other end (+X side) portion of the actuator holder 81h, and is fastened to the base plate 50. The screw 57c and the sleeve 56 are also taken as guide members that guide the hole 81b in the actuator holder 81h along the shaft 571 of the screw 57c and a cylindrical portion 56a (which will be described below) of the sleeve 56. The shaft 571 of the screw 57c and the sleeve 56 are also taken as shaft members standing from the base plate 50 along the Z direction (toward the −Z side). Further, the head 573 of the screw 57c is also taken as a protrusion protruding in the directions (X and Y directions) perpendicular to the direction in which the shaft 571 extends (Z direction).

The sleeve 56 has a multi-step structure and has two cylindrical portions 56a and 56b, the outer diameters of which differ from each other, as shown in FIG. 18. The outer diameter of the cylindrical portion 56a is substantially the same as the diameter of the hole 81b (specifically, the outer diameter is slightly smaller than the diameter of the hole), and the outer diameter of the cylindrical portion 56b is larger than the diameter of the hole 81b. The cylindrical portion 56a, which is located to the +Z side of the cylindrical portion 56b, fits (freely fits) into the hole 81b. Further, the cylindrical portion 56a passes through the hold 81b in the actuator holder 81h. In other words, the length Lb of the cylindrical portion 56a in the Z direction is greater than the thickness (the length in the Z direction) Lh of the actuator holder 81h (Lb>Lh). In particular, a gap SP2 is present between the +Z-side surface of the actuator holder 81h and the base plate 50 at the +X-side end portion of the actuator holder 81h.

Therefore, as described above, when the elastic member 58 elastically deforms to slightly shift the first drive unit 81 in the Z direction, the hole 81b in the actuator holder 81h is guided along the cylindrical portion 56a of the sleeve 56 and can move in the Z direction. In this action, the actuator holder 81h can move in the Z direction by the distance corresponding to the difference between the length Lb and the length Lh (Lb−Lh) at the maximum. As described above, the first drive unit 81 (actuator holder 81h) is connected to the base plate 50 in such a way that even the +X-side end portion of the first drive unit 81 is allowed to shift in the Z direction. The cylindrical portion 56a freely fits into the hole 81b with a predetermined amount of clearance (gap) present between the cylindrical portion 56a and the hole 81b. It is therefore possible to limit the variation in the position of the first drive unit 81 in the X and Y directions up to the amount of clearance between the cylindrical portion 56a and the hole 81b. That is, it is possible to limit the variation in the position of the first drive unit 81 in parallel to the reference plane PL, while the first drive unit is allowed to slightly shift in the Z direction.

1-4. Error in Dimension of Connection Path

A description will be made of a connection path CR from the second slider 70 through the second drive unit 82, the first slider 60, and the first drive unit 81 to the base plate 50.

Figure 20:
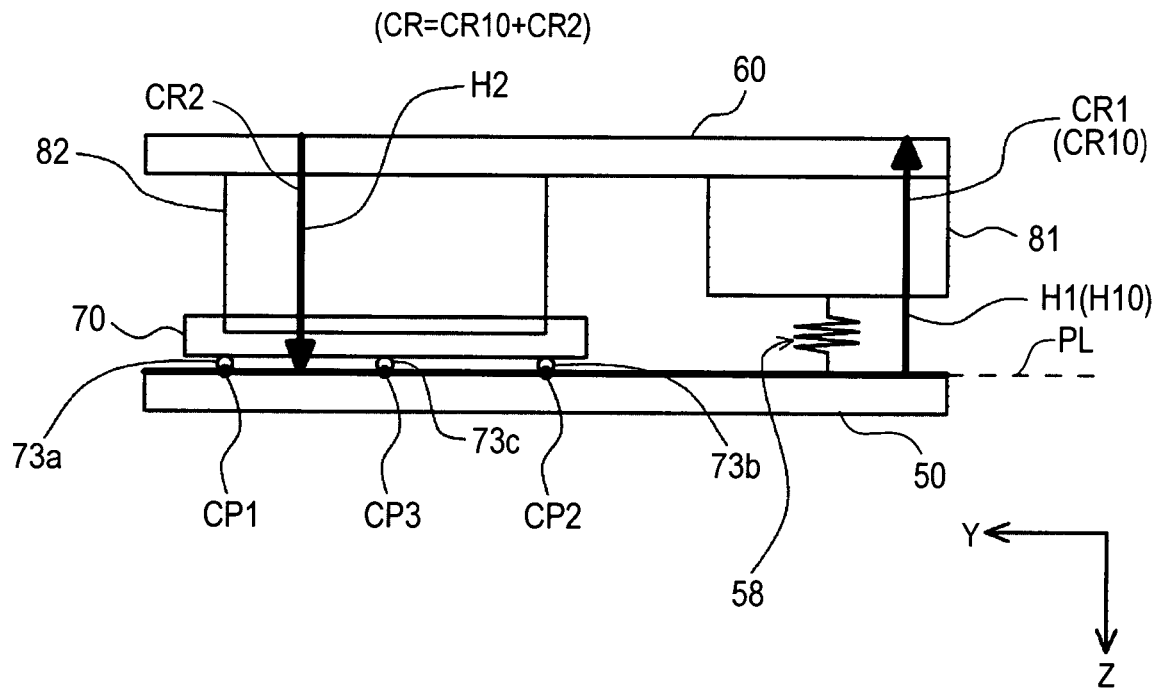
FIG. 20 diagrammatically shows a connection path according to an embodiment.
Figure 21:
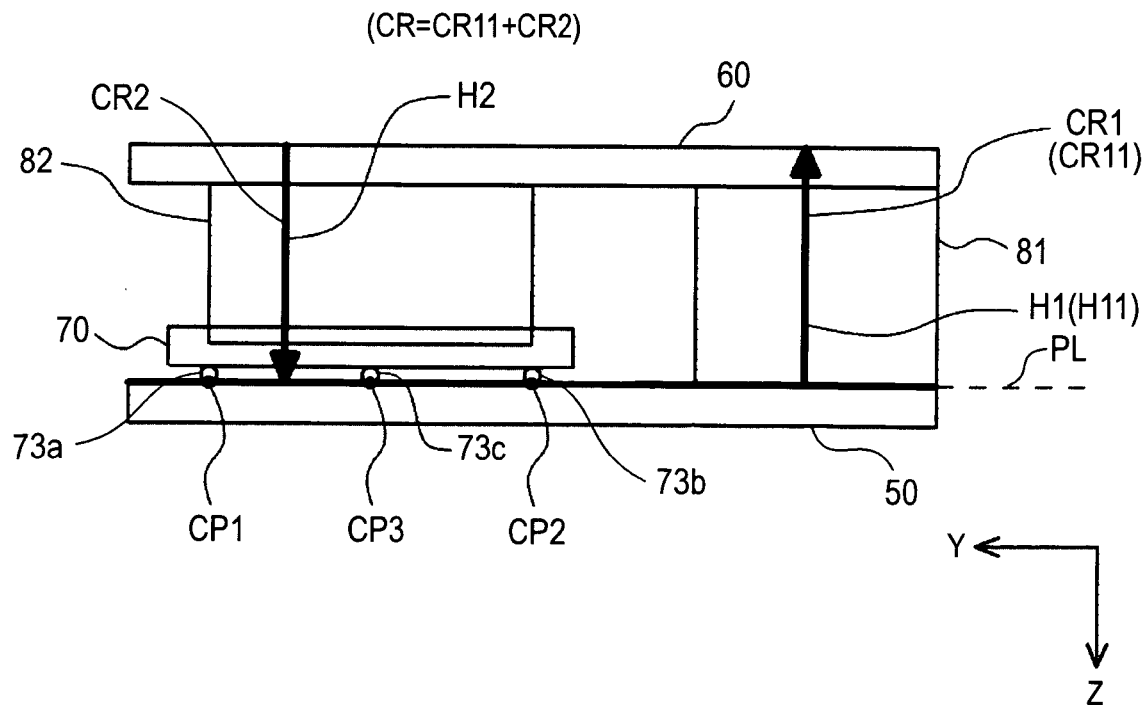
FIG. 21 is a diagrammatic view that is similar to FIG. 20 but relates to a comparative example.

FIG. 20 diagrammatically shows the connection path CR according to the present embodiment. On the other hand, FIG. 21 is a diagrammatic view that is similar to FIG. 20 but relates to a comparative example.

First, a problem with the comparative example shown in FIG. 21 will be described.

In the comparative example, unlike the present embodiment, the first drive unit 81 is directly glued and fixed to the base plate 50 with no elastic member 58 interposed. More specifically, the actuator holder 81h is directly glued and fixed to the base plate 50. The other configurations are the same as those in the first embodiment described above.

In the comparative example, in a connection path CR1 (CR11) from the base plate 50 through the first drive unit 81 to the first slider 60, for example, the upper surface of the first slider 60 is located at a height H1 (H11) from the reference plane PL of the base plate 50. In a connection path CR2 from the first slider 60 through the second drive unit 82 to the second slider 70, the steel ball 73a of the second slider 70 and other steel balls are in contact with the reference plane PL at a level lower than the upper surface of the first slider 60 by a height H2.

Ideally (when the dimension precision is very high), the height H1 and the height H2 have the same value. In other words, when the actual dimension of the connection path CR, which is the sum of the connection path CR1 and the connection path CR2, in the optical axis direction has a designed value, the height H1 and the height H2 have the same value (H1−H2=0). In this case, no problem occurs.

However, the actual dimension of a component often contains an error, and the components that form the connection path CR are no exceptions. That is, the actual dimensions of the components that form the connection path CR may contain errors. Further, errors may occur in the actual dimensions of the components due to deterioration with age and other factors.

First of all, the second slider 70 is preferably disposed in an accurate position relative to the base plate 50 in the optical axis direction (Z direction). For example, the second slider 70 is preferably located in a position in the optical axis direction (Z direction) where the second slider 70 is in contact with the base plate 50 at the three contact points CP1, CP2, and CP3 between the second slider 70 and the base plate 50. For example, as in the case of the present embodiment, when the second slider 70 is pressed against the base plate 50, for example, by the springs 85a, 85b, 85c, and 85d, the second slider 70 can be typically in contact with the base plate 50 at the three contact points CP1, CP2, and CP3. In the configuration described above, the second slider 70 can move in parallel to the reference plane PL while accurately positioned in a predetermined position in the optical axis direction.

On the other hand, when the actual dimensions of the components that form the connection path CR contain errors, the second slider 70 that has been in contact with the reference plane PL at the three points and hence already normally constrained is further constrained by the components that form the connection path CR. Such a situation is also taken as a situation in which the connection path CR different from "direct connection" (which will be described below) causes excessive constraint, that is, "over-constraint." The "direct connection" used herein means the state in which the base plate 50 is directly connected to the second slider 70 at the contact points CP1, CP2, and CP3.

Even when such over-constraint occurs, it is still possible to prevent the second slider 70 from separating from the reference plane PL by providing urging forces produced by the springs (urging members) 85a, 85b, 85c, and 85d or other components to press the second slider 70 against the base plate 50 as described above. In this case, however, dimensional errors result in unnecessary stress acting in the components that form the connection path CR. Any of the components will therefore deform to absorb the dimensional errors. Alternatively, under certain circumstances, the slide action along the drive shaft 81d or 82d is not normally carried out in the first drive unit 81 or the second drive unit 82, possibly resulting in degradation in shake correction performance of the drive unit 81 or 82. As described above, a situation in which the "over-constraint" occurs may disadvantageously prevent a smooth movement or cause other problems.

In contrast, in the present embodiment, the first drive unit 81 is not rigidly fixed to the base plate 50, but is fixed to the base plate 50 via the elastic member 58. The first drive unit 81 (the piezoelectric actuator 81X, the actuator holder 81h, and other components) can slightly shift in the Z direction when the elastic member 58 elastically deforms. Therefore, even when the dimensions of the components that form the connection path CR contain errors, elastic deformation of the elastic member 58 appropriately changes the height H1 (H10) (see FIG. 20). Specifically, the elastic member 58 elastically deforms to absorb the dimensional errors, whereby the height H1 (H10) can be a predetermined design dimension (or can be the same as the actual dimension of the height H2 of the connection path CR2). In this way, the positional error (dimensional error) of the connection path CR in the optical axis direction (Z direction), in which the base plate 50, the first slider 60, and the second slider 70 are connected, is absorbed, whereby the problem described above is solved or mitigated.

As described above, the present embodiment prevents the "over-constraint" and allows a smooth shake correction action to be readily achieved.

2. Second Embodiment

In the first embodiment described above, the movement of the first drive unit 81 in the X and Y directions is restricted by the portion where the protrusion 52 fits into the hole 81c and the portion where the cylindrical portion 56a of the sleeve 56 fits into the hole 81b in the actuator holder 81h.

In each of the fitting portions described above, however, the fitting is made with a predetermined gap (free fitting). Therefore, the actuator holder 81h moves not only in the Z direction but also in perpendicular to the Z direction (the X direction and/or the Y direction, for example). When the amount of movement is relatively large, the shake control performance is adversely affected.

In the second embodiment, a technique by which the above problem can be mitigated will be described. Features different from those in the first embodiment will be mainly described below.

Figure 22:
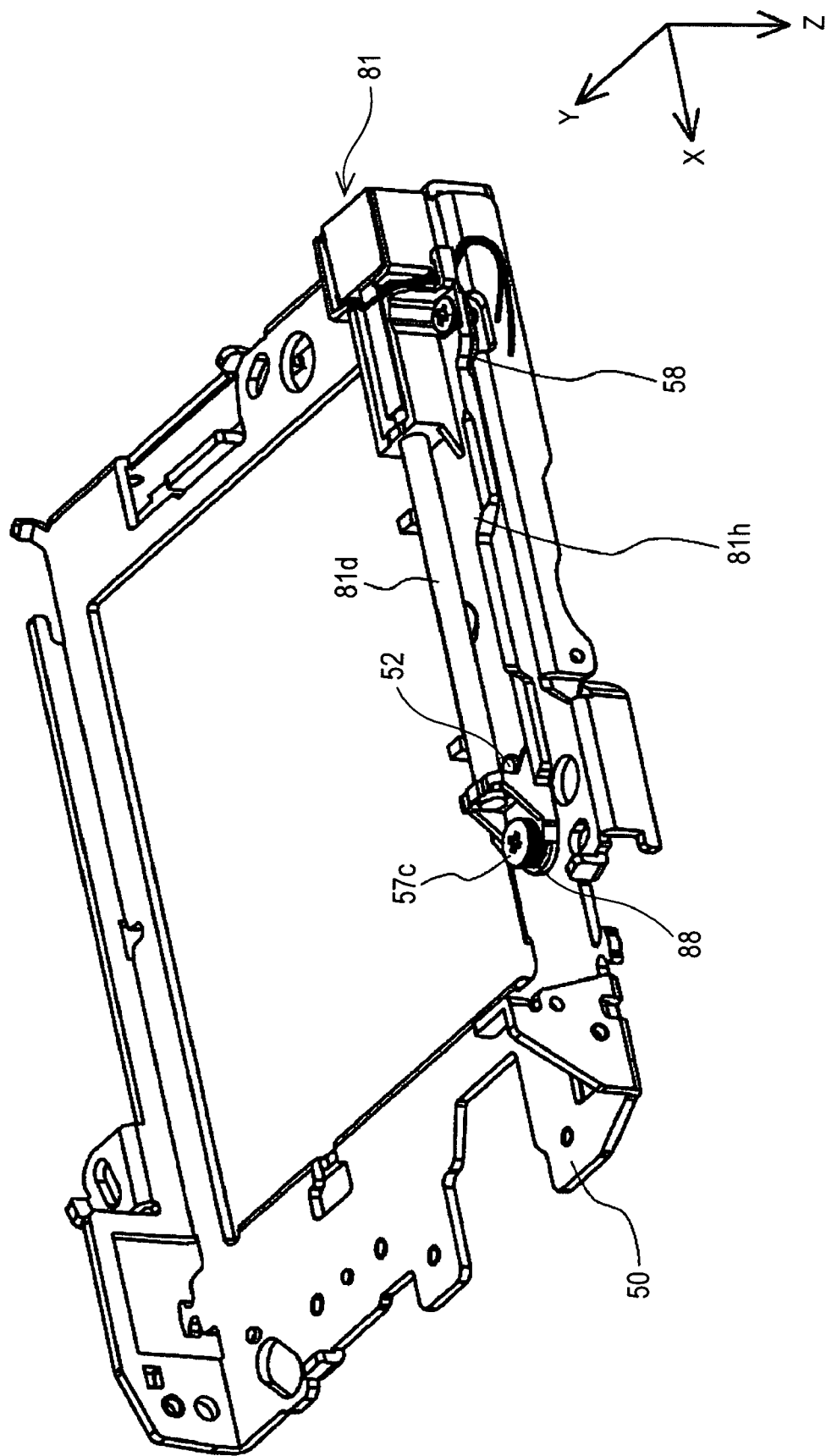
FIG. 22 is a perspective view showing the first drive unit attached to the base plate via the elastic member in a shake correction unit according to a second embodiment.
Figure 23:
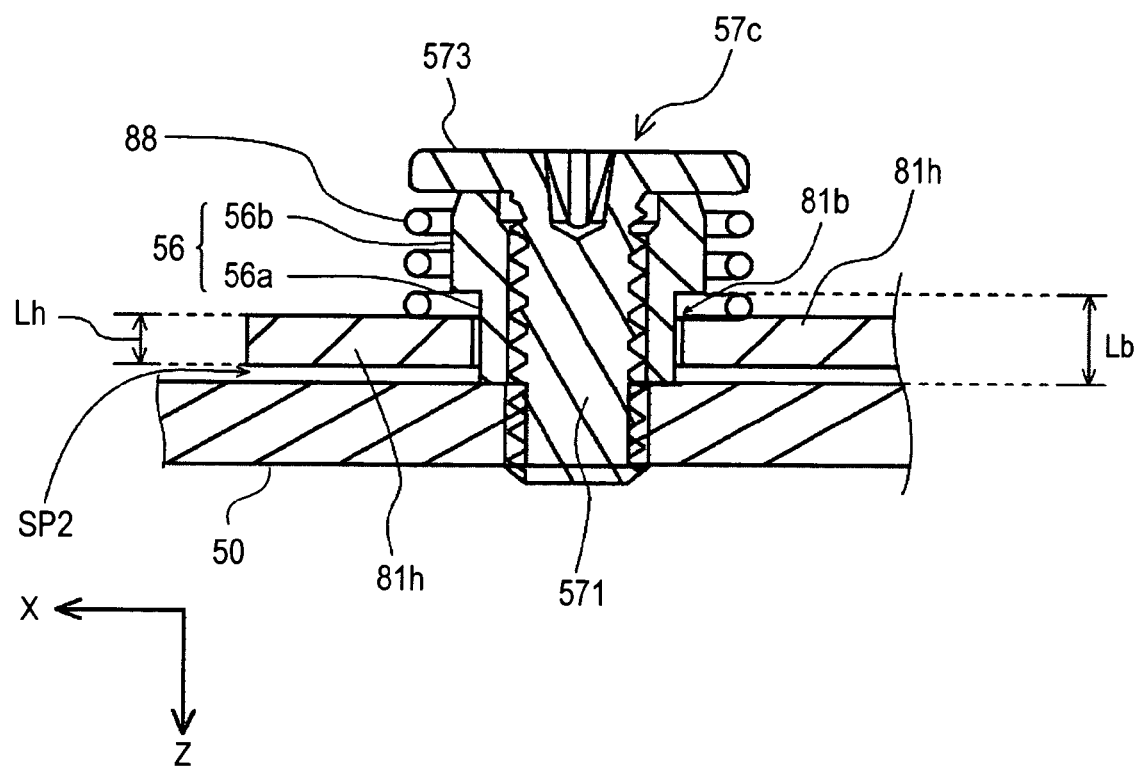
FIG. 23 is an enlarged view of part of the shake correction unit according to the second embodiment.

FIG. 22 is a perspective view showing the first drive unit 81 attached to the base plate 50 via the elastic member 58 in a shake correction unit 100B according to the second embodiment. FIG. 23 shows the screw 57c and its vicinity.

Comparing FIG. 23 with FIG. 18, one can see that the shake correction unit 100B in an imaging apparatus 1B according to the second embodiment further includes a coiled spring (elastic member) 88. The coiled spring 88 connects the first drive unit 81 to the head 573 of the screw 57c. Specifically, the coiled spring 88 compressed to a length shorter than its natural length is sandwiched between the −Z-side surface of the actuator holder 81h and the head 573 of the screw 57c. More specifically, the substantially cylindrical coiled spring 88 surrounds the sleeve 56.

In the configuration described above, the coiled spring 88 exerts a static frictional force, the magnitude of which corresponds to the elastic force (reaction force) of the coiled spring 88, on the actuator holder 81h. The static frictional force does not allow the first drive unit 81 (actuator holder 81h) to move in the X or Y direction. That is, the position of the first drive unit 81 will not vary in parallel to the reference plane PL. It is thus possible to prevent the actuator holder 81h (and hence the second slider 70 and the imaging device 5) from moving in parallel to the reference plane PL.

3. Others

While the embodiments of the invention have been described above, the invention is not limited thereto.

For example, the above embodiments have been described with reference to the case where the elastic member 58 is a flat spring. The elastic member 58 is not necessarily a flat spring, but maybe other types of elastic members (coiled spring, for example).

The above embodiments have been described with reference to the case where the base plate 50 is connected to the first drive unit 81 via the elastic member 58, but the elastic connection is not necessarily applied to the above components. For example, the first drive unit 81 may be connected to the first slider 60 via a similar elastic member. Alternatively, the first slider 60 may be connected to the second drive unit 82 via a similar elastic member. Further, the second drive unit 82 may be connected to the second slider 70 via a similar elastic member. That is, in the connection path CR where a plurality of elements are connected, the plurality of elements including the base plate 50, the first drive unit 81, the first slider 60, the second drive unit 82, and the second slider 70, any pair of adjacent two elements may be connected to each other via an elastic member capable of slightly deforming in the Z direction.

The present application contains subject matter related to that disclosed in Japanese Priority Patent Application JP 2008-154851 filed in Japan Patent Office on Jun. 13, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A shake correction unit comprising:
a base member;
a first movable member that moves relative to the base member in a first direction;
a second movable member that moves relative to the first movable member in a second direction;
a first drive unit provided between the base member and the first movable member, the first drive unit moving the base member and the first movable member relative to each other in the first direction; and
a second drive unit connecting the first movable member and the second movable member and being directly fixed to the second movable member, the second drive unit moving the first movable member and the second movable member relative to each other in the second direction,
wherein the second movable member is in contact with the base member at three contact points, and can move in parallel to a reference plane defined by the three contact points, and
the first drive unit is connected to the base member via a first elastic member capable of slightly deforming in a third direction perpendicular to the reference plane.

2. The shake correction unit according to claim 1,
wherein the first drive unit is connected to the base member via the first elastic member at one end portion, in the first direction, of the first drive unit with a gap present between the first drive unit and the base member.

3. The shake correction unit according to claim 2,
further comprising a guide member having a shaft member standing from the base member along the third direction,
wherein the shaft member freely fits into a hole provided in the other end portion, in the first direction, of the first drive unit, and
the guide member guides the movement of the hole in the third direction.

4. The shake correction unit according to claim 3,
further comprising a second elastic member that connects the first drive unit to the guide member at the other end portion of the first drive unit.

5. The shake correction unit according to claim 4,
wherein the guide member further includes a protrusion protruding from an end of the shaft member in a direction perpendicular to the direction in which the shaft member extends, and
the second elastic member is provided between the protrusion and the first drive unit, a static frictional force acting between the protrusion and the first drive unit preventing the variation in the position of the first drive unit in parallel to the reference plane.

6. The shake correction unit according to claim 1,
wherein the first elastic member includes
two flat portions the positions of which in the third direction differ from each other, and
a step that connects the two flat portions to each other,
a first flat portion, which is one of the two flat portions, is fixed to the first drive unit and a second flat portion, which is the other one of the two flat portions, is fixed to the base member at one end portion, in the first direction, of the first drive unit, and
the first drive unit is connected to the base member with a gap present between the first drive unit and the base member, whereby the first drive unit is allowed to shift in the third direction.

7. The shake correction unit according to claim 1,
wherein the first elastic member is a flat spring.

8. The shake correction unit according to claim 1,
further comprising an urging member that provides an urging force that presses the second movable member toward the reference plane.

9. The shake correction unit according to claim 1,
wherein the first drive unit is connected to the base member via the first elastic member in such a way that the first drive unit is allowed to shift in the third direction at least at one end portion, in the first direction, of the first drive unit.

10. The shake correction unit according to claim 9,
wherein the first drive unit is connected to the base member via the first elastic member in such a way that the first drive unit is allowed to shift in the third direction also at the other end portion, in the first direction, of the first drive unit.

11. An imaging apparatus comprising:
a body; and
a shake correction unit provided in the body, the shake correction unit moving an optical element to correct a shake,
wherein the shake correction unit includes
a base member,
a first movable member that moves relative to the base member in a first direction,
a second movable member that moves relative to the first movable member in a second direction,
a first drive unit provided between the base member and the first movable member, the first drive unit moving the base member and the first movable member relative to each other in the first direction, and
a second drive unit connecting the first movable member and the second movable member and being directly fixed to the second movable member, the second drive unit moving the first movable member and the second movable member relative to each other in the second direction,
the second movable member is in contact with the base member at three contact points, and can move in parallel to a reference plane defined by the three contact points, and
the first drive unit is connected to the base member via an elastic member capable of slightly deforming in a third direction perpendicular to the reference plane.

12. A shake correction unit comprising:
a base member;
a first movable member that moves relative to the base member;
a second movable member that moves relative to the first movable member;
a first drive unit provided between the base member and the first movable member, the first drive unit moving the base member and the first movable member relative to each other in a first direction; and
a second drive unit connecting the first movable member and the second movable member and being directly fixed to the second movable member, the second drive unit moving the first movable member and the second movable member relative to each other in a second direction,
wherein the second movable member is in contact with the base member at three contact points, and can move in parallel to a reference plane defined by the three contact points, and
in a connection path in which a plurality of elements are connected, the plurality of elements including the base member, the first drive unit, the first movable member, the second drive unit, and the second movable member, any pair of adjacent two elements are connected to each other via an elastic member capable of slightly deforming in a third direction perpendicular to the reference plane.

13. An imaging apparatus comprising:
a body; and
a shake correction unit provided in the body, the shake correction unit moving an optical element to correct a shake,
wherein the shake correction unit includes
a base member,
a first movable member that moves relative to the base member,
a second movable member that moves relative to the first movable member,
a first drive unit provided between the base member and the first movable member, the first drive unit moving the base member and the first movable member relative to each other in a first direction, and
a second drive unit connecting the first movable member and the second movable member and being directly fixed to the second movable member, the second drive unit moving the first movable member and the second movable member relative to each other in a second direction, the second movable member is in contact with the base member at three contact points, and can move in parallel to a reference plane defined by the three contact points, and in a connection path in which a plurality of elements are connected, the plurality of elements including the base member, the first drive unit, the first movable member, the second drive unit, and the second movable member, any pair of adjacent two elements are connected to each other via an elastic member capable of slightly deforming in a third direction perpendicular to the reference plane.

* * * * *